(12) United States Patent
Eguchi

(10) Patent No.: US 8,730,593 B2
(45) Date of Patent: May 20, 2014

(54) IMAGE PICKUP OPTICAL SYSTEM AND IMAGE PICKUP APPARATUS HAVING THE SAME

(71) Applicant: Canon Kabushiki Kaisha, Tokyo (JP)

(72) Inventor: Kaoru Eguchi, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/753,946

(22) Filed: Jan. 30, 2013

(65) Prior Publication Data

US 2013/0194487 A1    Aug. 1, 2013

(30) Foreign Application Priority Data

Jan. 30, 2012    (JP) .................. 2012-016349

(51) Int. Cl.
*G02B 13/02*    (2006.01)
*G02B 27/64*    (2006.01)

(52) U.S. Cl.
USPC ............................ 359/745; 359/748; 359/557

(58) Field of Classification Search
USPC ................... 359/745–748, 554, 557
See application file for complete search history.

(56) References Cited

U.S. PATENT DOCUMENTS

| 5,745,306 | A | 4/1998 | Sato |
| 5,757,555 | A | 5/1998 | Sato |
| 7,426,083 | B2 * | 9/2008 | Endo ............................ 359/745 |
| 8,233,223 | B2 * | 7/2012 | Lee ............................. 359/748 |
| 2009/0190239 | A1 * | 7/2009 | Suzuki ......................... 359/748 |

FOREIGN PATENT DOCUMENTS

| JP | 08-327897 A | 12/1996 |
| JP | 09-145996 A | 6/1997 |
| JP | 2009-271354 A | 11/2009 |

* cited by examiner

*Primary Examiner* — Scott J Sugarman
(74) *Attorney, Agent, or Firm* — Rossi, Kimms & McDowell LLP

(57) ABSTRACT

An image pickup optical system includes, in order from an object side to an image side, a first lens unit that does not move for focusing and has a positive optical power, a second lens unit that moves during focusing, an aperture diaphragm, and a third lens unit that does not move for focusing. The image pickup optical system includes a diffractive optical element, and an optical element NLF made of a solid material on the object side of an intersection between a paraxial chief ray and an optical axis. The predetermined conditional expressions are satisfied.

18 Claims, 10 Drawing Sheets

IMAGE PICKUP OPTICAL SYSTEM AND IMAGE PICKUP APPARATUS HAVING THE SAME

BACKGROUND OF THE INVENTION

1. Field of the Invention

The present invention relates to an image pickup optical system and an image pickup apparatus having the same, suitable, for example, for a video camera, a digital still camera, a TV camera, and a surveillance camera, each of which uses an image sensor, and a film-based camera that uses a silver film.

2. Description of the Related Art

A so-called telephoto type image pickup optical system (telephoto lens) is known as an image pickup optical system having a long focal length, and includes, in order from an object side to an image side, a front lens unit having a positive refractive power and a rear lens unit having a negative refractive power. The "long focal length," as used herein, means, for example, a focal length longer than the size of an effective image pickup range. In general, as the focal length becomes longer in a telephoto lens having a long focal length, a large amount of a chromatic aberration, such as a longitudinal chromatic aberration and a lateral chromatic aberration, particularly occurs among a variety of aberrations.

JP H09-145996 (corresponding to U.S. Pat. No. 5,757,555) discloses an (achromatic) telephoto lens in which a positive lens made of a low dispersion material that has an abnormal partial dispersion characteristic, such as fluorite or brand name S-FPL51 (Ohara Inc.) is combined with a negative lens made of a high dispersion material so as to correct these chromatic aberrations. This reference discloses a telephoto lens having a focal length of 294 mm to 392 mm and an F-number of about 4.08 to 5.6. In addition, as the F-number becomes smaller, large amounts of a spherical aberration and a coma particularly occur among a variety of aberrations in the telephoto lens having the small F-number.

In order to correct the spherical aberration and the coma in the telephoto lens having the small F-number, JP H08-327897 (corresponding to U.S. Pat. No. 5,745,306) discloses a telephoto lens that has an increased number of lenses and an increased degree of freedom to the aberrational corrections. This reference discloses a telephoto lens having a large aperture ratio, an F-number of about 2.88 to 4.08 and a focal length of 294 mm to 588 mm, and increases the lens number so as to correct the aberration.

One known method uses a refractive optical element in which a refractive optical unit configured to provide diffractions is provided on a substrate, for a lens surface or part of an optical system, so as to correct the variety of aberrations containing a chromatic aberration of the optical system and to reduce the weight of the lens. JP 2009-271354 discloses an optical system that reduces an overall lens weight by using this method to correct the chromatic aberration, to shorten the overall lens length (distance from the first lens surface to the image plane), and to make a lens of a glass material having a comparatively small specific gravity.

This reference discloses a telephoto lens having a large aperture ratio, a focal length of 293 mm to 391 mm, and an F-number of about 2.9 to 4.1, thereby excellently correcting a chromatic aberration using a diffractive optical element. This reference shortens an overall lens length, corrects a monochrome aberration of a single color using an aspheric surface by an increased power of the first lens unit, and rectifies the chromatic aberration using a diffractive optical element. This configuration corrects various aberrations, and reduces an overall size and an overall weight.

In most image pickup lenses (optical systems), focusing from an infinitely distant object to the closest object is performed by moving all or part of lens unit(s) in the image pickup lens. The telephoto lens having a long focal length is likely to increase the overall lens size or the overall lens weight, and thus it is structurally difficult to move the entire telephoto lens for focusing.

Thus, the conventional telephoto lens usually moves part of lens units for focusing. Among them, an inner focus type focusing moves part of lens units which is comparatively small and lightweight and located at central rather than front in the optical system. Each of the telephoto lenses in the above three references includes, in order from the object side, a first lens unit having a positive refractive power and a second lens unit having a negative refractive power. The second lens unit is moved to the image plane side for focusing.

In general, the overall lens system becomes larger as a focal length becomes longer in the telephoto lens. It is therefore important for a telephoto lens to maintain a miniaturization of the overall lens system, and to properly and particularly correct the chromatic aberration among a variety of aberrations caused by the increased focal length. Moreover, it becomes important to provide faster focusing a small and lightweight lens unit other than the front lens unit and to lessen the burden of the driving unit.

In general, the front lens unit having a positive refractive power particularly becomes larger and heavier as the focal length becomes longer in a telephoto lens. It is thus important for the telephoto lens to properly set a lens configuration of the front lens unit having a positive refractive power in order to realize the small and lightweight configuration, to properly correct the chromatic aberration, and to obtain a high optical performance. The improper lens configuration of the front lens unit causes the overall system to be larger and amounts of the variety of aberrations to increase, and makes it very difficult to obtain a high optical performance.

SUMMARY OF THE INVENTION

The present invention provides an image pickup optical system and an image pickup apparatus having the same, which can easily correct a variety of aberrations containing a chromatic aberration and reduce a size of an overall optical system and an overall lens weight.

An image pickup optical system according to the present invention includes, in order from an object side to an image side, a first lens unit that does not move for focusing and has a positive optical power, a second lens unit that moves during focusing, an aperture diaphragm, and a third lens unit that does not move for focusing. The first lens unit includes a diffractive optical element, and an optical element NLF made of a solid material on the object side of an intersection between a paraxial chief ray and an optical axis. The following conditional expressions are satisfied where f is a focal length of an entire image pickup optical system, $f_1$ is a focal length of the first lens unit, Fno is an F-number of the entire image pickup optical system in focusing upon an infinitely distant object, $d_{1a}$ is a distance from a lens surface vertex of the first lens unit closest to an object to a lens surface vertex of the first lens unit closest to an image, $f_{DOE}$ is a focal length only by a diffraction component of the diffractive optical element, $f_{NLF}$ is a focal length of the optical element NLF, and $\Delta\theta g_{FNLF}$ is a partial dispersion ratio difference of a material of the optical element NLF:

$$4.0 < f^2/(f_1 \times Fno \times d_{1a}) < 10.0;$$

$$20 < f_{DOE} \times f_{NLF}/f^2 < 1000; \text{ and}$$

$$0.0272 < \Delta\theta g_{FNLF} < 0.3000.$$

Further features of the present invention will become apparent from the following description of exemplary embodiments with reference to the attached drawings.

DESCRIPTION OF THE EMBODIMENTS

A variety of embodiments of the present invention will be described in detail with reference to the accompanying drawings. An image pickup optical system according to the present invention includes, in order from the object side to the image side, a first lens unit which has a positive refractive power (where the optical power is a reciprocal of a focal length) and does not move (or is fixed) for focusing and a second lens unit configured to move during focusing, on an object side of the aperture diaphragm, and a third lens that does not move for focusing and is located on the image side of the aperture diaphragm. Alternatively, an image pickup optical system according to the present invention includes, in order from the object side to the image side, a first lens unit which has a positive refractive power and does not move for focusing is located, on the object side of the aperture diaphragm, and a second lens unit which has a positive refractive power and does not move for focusing and a third lens unit that moves during focusing, on the image side of the aperture diaphragm.

Figure 1A:
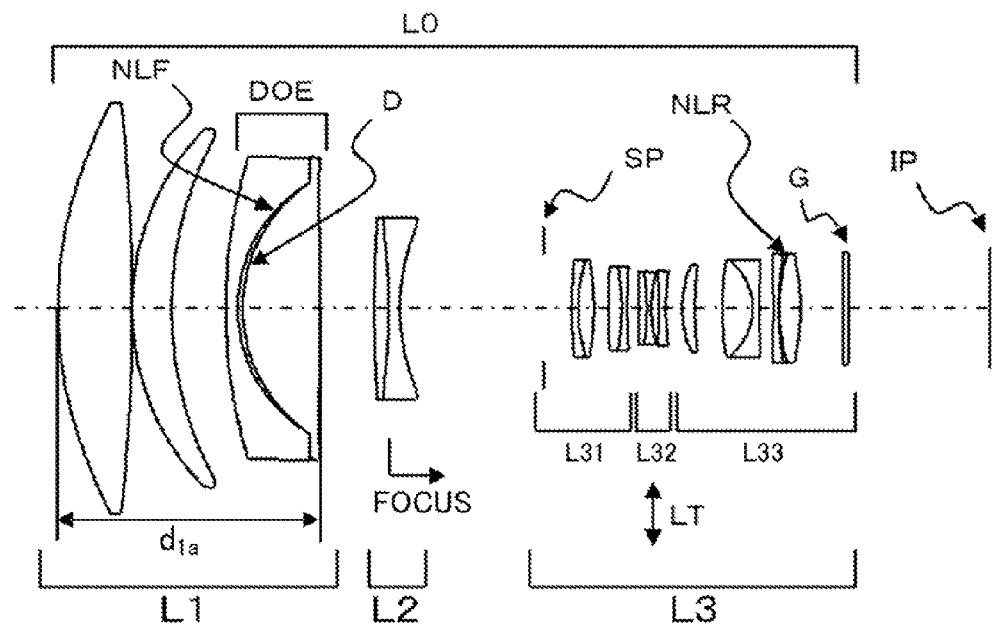
FIG. 1A is a lens sectional view of an image pickup optical system according to a first embodiment and FIG. 1B is its aberrational diagram.
Figure 1B:
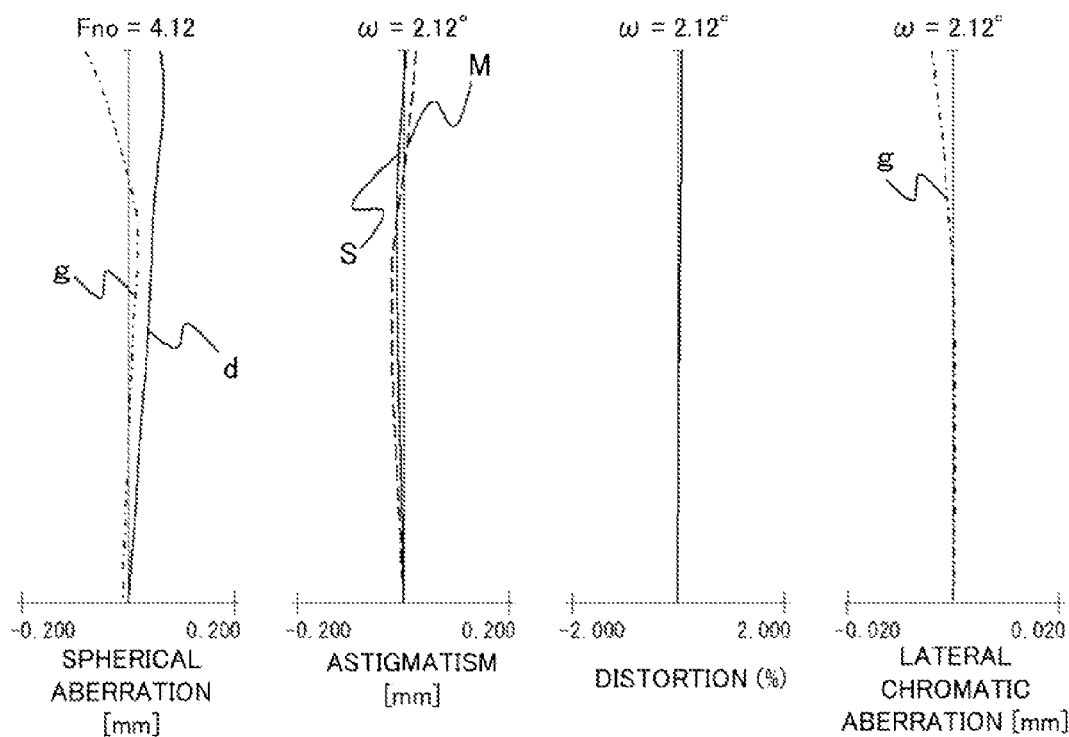
Figure 2A:
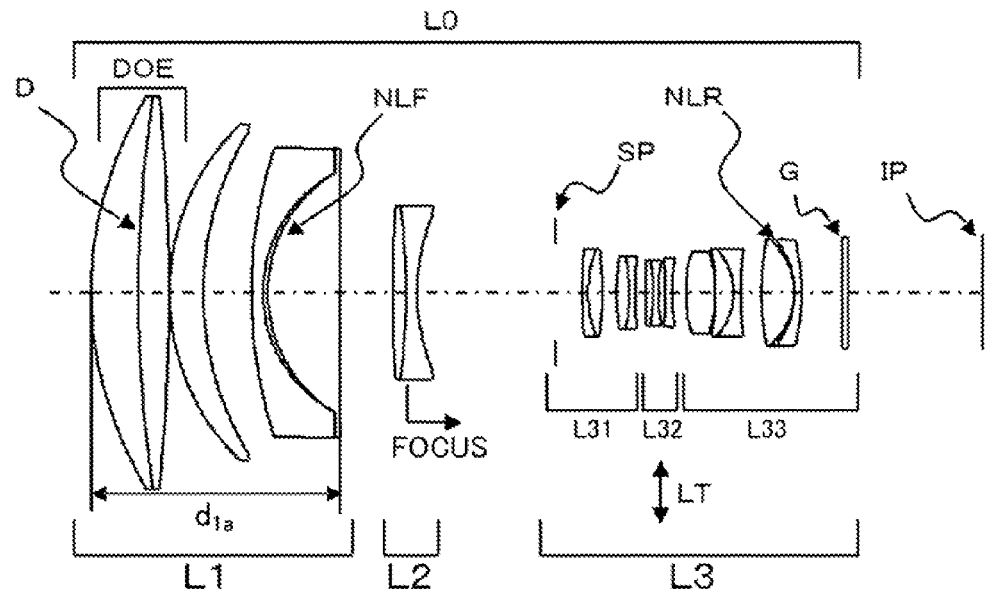
FIG. 2A is a lens sectional view of an image pickup optical system according to a second embodiment and FIG. 2B is its aberrational diagram.
Figure 2B:
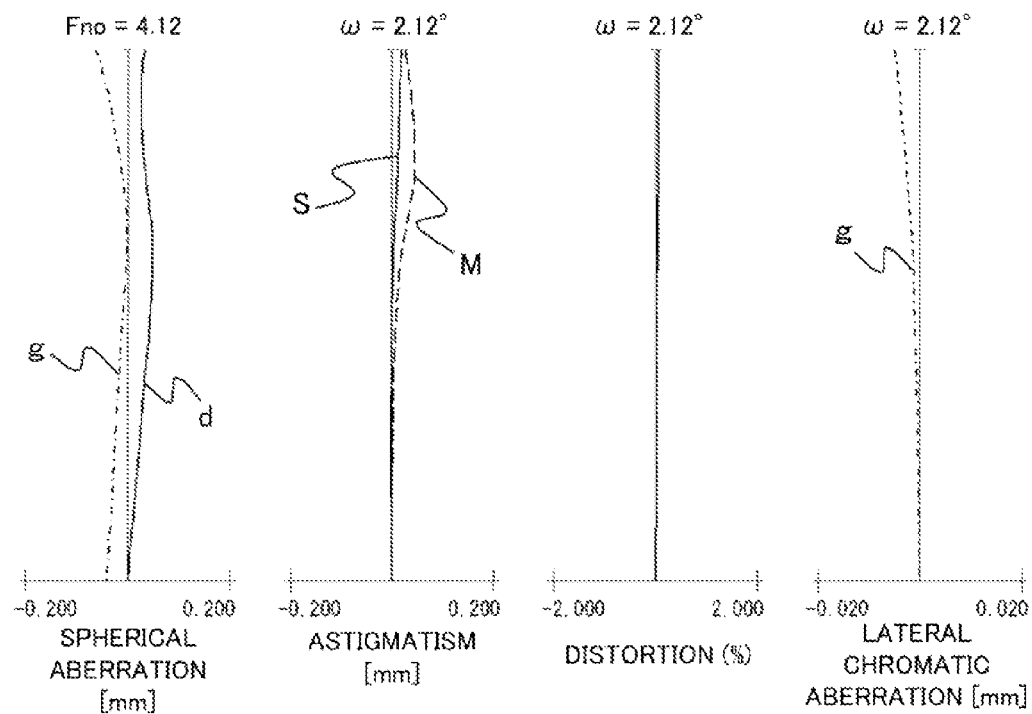
Figure 8A:
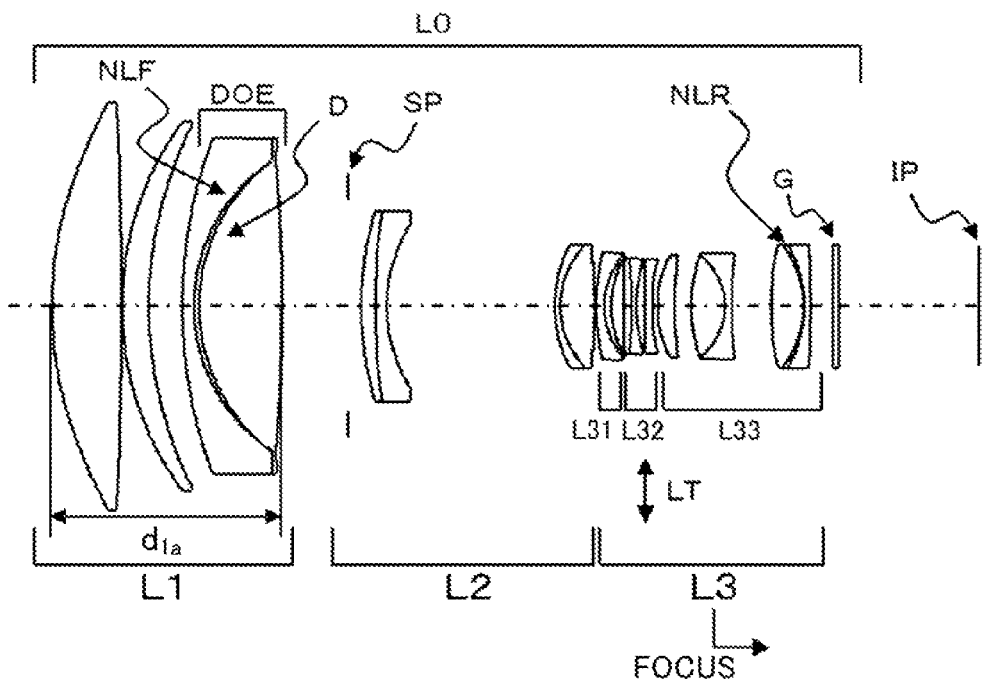
FIG. 8A is a lens sectional view of an image pickup optical system according to an eighth embodiment and FIG. 8B is its aberrational diagram.
Figure 8B:
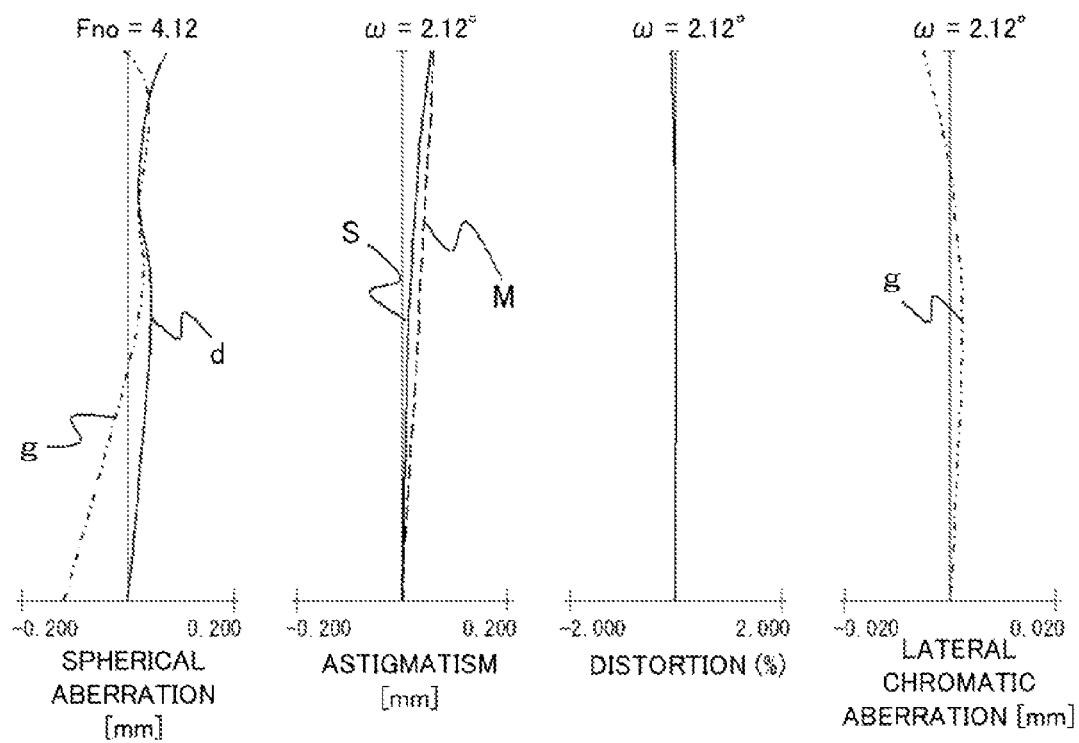
Figure 9:
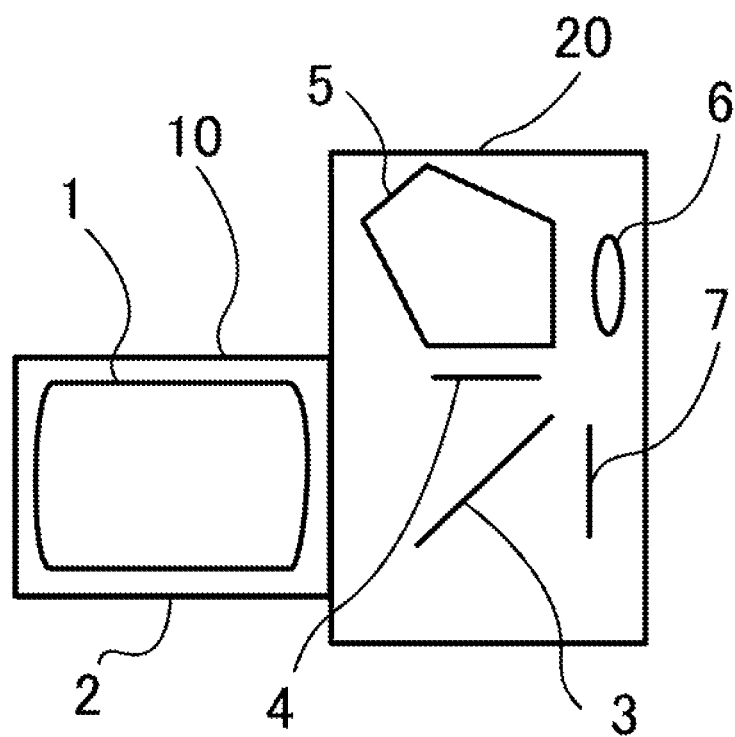
FIG. 9 is a schematic principal view of an image pickup apparatus.

FIGS. 1A, 2A . . . 7A, and 8A are lens sectional views of the image pickup optical systems according to the first to eighth embodiments. FIGS. 1B, 2B . . . 7B and FIG. 8B are longitudinal aberrational diagrams of the image pickup optical systems according to the first to eighth embodiments. FIG. 9 is a schematic view of principal part of a single-lens reflex camera system (image pickup apparatus).

In each lens sectional view, "L0" denotes an image pickup optical system. "SP" denotes an aperture diaphragm. The image pickup optical system L0 includes, in order from the object side to the image side, a first lens unit L1 having a positive refractive power, a second lens unit L2, and a third lens unit L3. The first lens unit L1 includes, in order from the object side to the image side, a first positive lens element, a second positive lens element having a meniscus shape having a convex surface on the object side, and a cemented lens. Herein, the first positive lens element, the second positive lens element, and the cemented lens are separated by air intervals.

"NLF" denotes an optical element NLF made of a solid material. The second lens unit L2 includes a cemented lens made by connecting a positive lens element to a negative lens element. The second lens unit L2 includes a cemented lens made by connecting a positive lens element to a negative lens element. Alternatively, the second lens unit L2 includes a cemented lens made by connecting a positive lens element to a negative lens element, and a cemented lens made by connecting a negative lens element to a positive lens element. The third lens unit L3 includes a first lens subunit L31 having a positive or negative refractive power, a second lens subunit L32 having a negative refractive power and configured to move so that it has a component of a direction orthogonal to the optical axis so as to move an imaging position of an taken image in a direction perpendicular to the optical axis, and a third lens subunit L33 having a positive refractive power.

"NLR" denotes an optical element NLR made of a solid material. "IP" denotes an image plane, which corresponds to an image pickup plane of an image sensor (photoelectric conversion element), such as a CCD sensor and a CMOS sensor, configured to receive light of an image when it is used for an image pickup optical system of a video camera and a digital camera, and a film plane when it is used for an image pickup optical system in a film-based camera. "DOE" denotes a diffractive optical element. D is a diffractive optical part (diffractive optical surface) which constitutes part of the diffractive optical element DOE. The diffractive order m of a diffracted light flux used for this embodiment is 1 (first order) among the diffracted light fluxes caused by the diffractive optical part D, and a designed wavelength $\lambda_0$ is a wavelength (587.56 nm) of the d-line.

The number of diffractive optical surfaces D provided on the image pickup optical system L0 is not limited to one and may be plural for better optical performance. The diffractive optical surface D may be made with an aspheric base whose material is not limited to a glass material, such as synthetic resin, as long as it transmits the light.

In each aberrational diagram, "d" denotes the d-line and "g" denotes the g-line. "M" denotes a meridional image plane, and "S" denotes a sagittal image plane. The lateral chromatic aberration is illustrated by the g-line. Fno denotes an F-number, and ω denotes a half angle of view. In all aberrational diagrams, the spherical aberration is 0.2 mm, the astigmatism is 0.2 mm, the distortion is 2%, and the lateral chromatic aberration is drawn on the scale of 0.02 mm.

In general, in the telephoto lens, a maximum value of a height from the optical axis at which a paraxial marginal ray passes the lens surface on the object side of an intersection between the optical axis and a paraxial chief ray is larger than that at which the paraxial marginal ray passes the lens surface on the image side of the intersection between the optical axis and the paraxial chief ray. The telephoto lens thus has a so-called telephoto type lens configuration. Herein, the "paraxial marginal ray" is a paraxial ray when the focal length of the entire optical system is normalized into 1 and a light flux having a height of 1 from the optical axis is introduced parallel to the optical axis of the optical system. Assume that the object is located on the left side of the optical system, and a ray incident from the object side upon the optical system advances from left to right. When the focal length of the entire optical system is normalized into 1, the "paraxial chief ray" is a paraxial ray that passes an intersection between an incident pupil and the optical axis of the optical system among rays incident upon the optical axis by −45°. An incident angle upon the optical system is positive when a direction around from the optical axis is clockwise and negative when it is counterclockwise.

A light flux used to determine the F-number may be determined with the lens diameter near the object side so as to effectively achieve a large aperture (or reduced F-number). Then, a lens closer to the object has a larger effective diameter in the telephoto lens. In particular, as the F-number becomes smaller, an effective diameter of the lens increases, an outer diameter increases accordingly, and the weight of the material increases approximately by the third power. As a consequence, a lens on the object side is likely to become heavier than a lens on the image side in the telephoto lens of a large aperture ratio.

In order to reduce the weight of the entire lens system in such a scenario, it is necessary to shorten the overall lens length, to reduce the number of lenses in the first lens unit, and to reduce the lens diameter while the specification and the imaging performance are maintained.

Accordingly, in order to reduce the weight of the entire lens system in the telephoto type lens system, each embodiment shortens the overall lens length. One conceivable method of shortening the overall lens length is to strengthen the power of the first lens unit having a positive power and to thin the thickness of the first lens unit. However, the spherical aberration and the coma are more likely to increase in a telephoto lens having an F-number smaller than a focal length than those in a telephoto lens having the F-number larger than the focal length.

Prior art correct a variety of aberrations for the telephoto lens having the small F-number rather than the telephoto lens having the large F-number, by increasing the number of lenses in the first lens unit. The effective diameter of the first lens unit in the telephoto lens having the small F-number is larger than that of the telephoto lens having the large F-number. Therefore, if the power of the first lens unit is simply strengthened so as to shorten the overall lens length as in the telephoto lens having the large F-number, the positive lens element in the first lens unit becomes thicker because the effective diameter of the first lens unit is larger than that of the telephoto lens having the large F-number.

The weight of the material of the first lens unit consequently increases, and the weight reduction suitable for the shortened overall lens length becomes difficult. Moreover, since there are many lenses, an available air interval used to shorten the overall lens length is short and the shortening effect of the overall lens length is insufficient.

Each embodiment maintains the specification or the imaging performance of the image pickup lens, reduces the number of lenses in the first lens unit L1, thins the lens unit thickness of the first lens unit L1, and shortens the overall lens length.

As a specific configuration for each embodiment, the first lens unit L1 includes, in order from the object side to the image side, the first positive lens element and the second positive lens element having a meniscus shape having a convex surface on the object side, and a cemented lens. In addition, the diffractive optical element DOE and the optical element NLF are located on the object side of the intersection between the paraxial chief ray and the optical axis, and the optical element NLF is made of the solid material defined by the following conditional expression(s). An aspheric surface is provided if necessary on the object side of the intersection between the paraxial chief ray and the optical axis.

Since the first lens unit includes the aspheric surface and the diffractive optical element, a monochromatic aberration, such as the spherical aberrations and the coma, and the chromatic aberration of the lens unit closer to the object can be corrected and it becomes easy to reduce the number lenses. In addition, the positive lens element in the first lens unit L1 converges the light flux and shortens the overall lens length. Moreover, the second positive lens element having the meniscus shape compensates for the positive power to shorten the overall lens length, and corrects the spherical aberration and the coma with the aspheric surface utilizing a curvature difference between the lens surface on the object side and the lens surface on the image side. As a result, the power and the aberration correction of the first lens unit are compromised.

The first lens unit L1 includes the cemented lens, suppresses a lens's positional sensitivity caused by the manufacturing errors, and corrects the chromatic aberration of the first lens unit L1. In addition, a chromatic aberration between the g-line and the F-line is corrected by employing the optical element NLF made of the solid material. This is because when the overall lens length is shortened by increasing the power of the first lens unit L1, the correction of the chromatic aberration between the g-line and the F-line becomes insufficient. Next follows a description of a mechanism of correcting the chromatic aberration.

In the telephoto lens, the paraxial marginal ray passes a high position from the optical axis on the object side of the intersection between the paraxial chief ray and the optical axis, and thus a larger amount of a longitudinal chromatic aberration occurs than that on the image side. As a position becomes closer to the object (or image) from the intersection between the paraxial chief ray and the optical axis, the off-axis principal ray passes the periphery of the lens and a large amount of a lateral chromatic aberration occurs.

Hence, each embodiment arranges the diffractive optical element DOE on the object side of the intersection between the paraxial chief ray and the optical axis, and corrects both the longitudinal chromatic aberration and the lateral chromatic aberration. In particular, each embodiment corrects the chromatic aberration between the g-line and the F-line as well as the chromatic aberration between the C-line and the F-line.

As the power of the first lens unit L1 is strengthened so as to shorten the overall lens length, the chromatic aberration, in particular, the chromatic aberration between the g-line and the F-line increases. In an attempt to correct the chromatic aberration in the first lens unit L1, it is difficult to achromatize four wavelengths of the d-line, g-line, C-line, and F-line for both the longitudinal chromatic aberration and the lateral chromatic aberration only using the diffractive optical element DOE and glass, because the effect on the longitudinal chromatic aberration is different from the effect on the lateral chromatic aberration. In particular, the longitudinal chromatic aberration between the g-line and the F-line is overcorrected in an attempt to correct the lateral chromatic aberration.

In an attempt to correct the longitudinal chromatic aberration, the correction of the lateral chromatic aberration becomes insufficient between the g-line and the F-line. This is a reason why the chromatic aberration between the g-line and the F-line is insufficient when the power of the first lens unit L1 is increased so as to shorten the overall lens length only using the diffractive optical element DOE and glass. Accordingly, each embodiment provides at least one optical element NLF made of the solid material on the object side of the intersection between the paraxial chief ray and optical axis so as to correct the chromatic aberration between the g-line and the F-line. As a result, an image pickup optical system becomes lightweight as a whole and provides a high quality image.

Focusing is achieved by moving the entire image pickup optical system or by moving part of lens unit(s) in the image pickup optical system in most image pickup optical systems. In a telephoto lens having a large aperture ratio, a long focal length, and a small F-number, the lens system is larger and heavier than a telephoto lens having a large F-number. Therefore, it is mechanically difficult to move the entire telephoto lens for focusing.

Accordingly, each embodiment provides focusing in each image pickup optical system by moving in the optical axis a small and lightweight lens unit located on the image side of the first lens unit L1 in the image pickup optical system. Thereby, focusing a small driving unit becomes much easier than focusing achieved by moving the entire optical system or the entire first lens unit L1.

Each embodiment arranges the third lens unit L3 on the image side of the second lens unit L2 in each image pickup optical system. When the third lens unit L3 is arranged on the image side of the second lens unit L2, the axial ray becomes lower in height and a lens surface can be arranged at part where the off-axis principal ray passes at a high position. As a result, the corrections of the curvature of field and the lateral chromatic aberration become easier.

The image pickup optical system L0 of each embodiment includes, in order from the object side to the image side, the first lens unit L1 having a positive refractive power, the second lens unit L2 having a positive or negative refractive power, and the third lens unit L3 having a positive or negative refractive power.

The second lens unit L2 or the third lens unit L3 is moved in the optical axis direction for focusing.

In each embodiment, assume that $f_1$ denotes a focal length of the first lens unit L1, f denotes a focal length of the entire optical system, Fno denotes an F-number of the entire optical system in focusing upon the infinitely distant object, $d_{1a}$ denotes a distance from a lens surface vertex closest to the object in the first lens unit L1 to a lens surface vertex closest to the image in the first lens unit L1, $f_{DOE}$ denotes a focal length only by the diffraction component of the diffractive optical element DOE, $f_{NLF}$ denotes a focal length of the optical element NLF, and $\Delta\theta g_{FNLF}$ is a partial dispersion ratio difference of the material of the optical element NLF.

Then, the following conditional expressions are satisfied:

$$4.0 < f^2/(f_1 \times Fno \times d_{1a}) < 10.0 \quad (1)$$

$$20 < f_{DOE} \times f_{NLF}/f^2 < 1000 \quad (2)$$

$$0.0272 < \Delta\theta g_{FNLF} < 0.3000 \quad (3)$$

The partial dispersion ratio difference $\Delta\theta g_{FNLF}$ is defined as follows where $N_{dNLF}$ is a refractive index to the d-line of the optical element NLF made of the solid material, $N_{NLF}$ is a refractive index to the g-line of the optical element NLF, $N_{CNLF}$ is a refractive index to the C-line of the optical element NLF, and $N_{FNLF}$ is a refractive index to the F-line of the optical element NLF:

$$v_{dNLF} = (N_{dNLF}-1)/(N_{FNLF}-N_{CNLF}) \theta g_{FNLF} = (N_{gNLF}-N_{FNLF})/(N_{FNLF}-N_{CNLF}) \theta g_{FBF} = -1.665 \times 10^{-7} \times v_{dNLF}^3 + 5.213 \times 10^{-5} \times v_{dNLF}^2 - 5.656 \times 10^{-3} \times v_{dNLF} + 0.7278$$

$$\Delta\theta g_{FNLF} = \theta g_{FNLF} - \theta g_{FBF}$$

Next follows a technical meaning of each of the above conditional expressions. The conditional expression (1) relates to the power and the thickness of the lens unit of the first lens unit L1 in the image pickup optical system L0. When the value exceeds the upper limit value of the conditional expression (1), the power of the first lens unit L1 becomes excessively strong or the lens unit becomes excessively thin. Although both are effective in shortening the overall lens length, it becomes difficult to correct the spherical aberration and the coma in the first lens unit L1 and the corrections of the spherical aberration and the coma become insufficient in the entire lens system.

On the other hand, when the value exceeds the lower limit value in the conditional expression (1), the power of the first lens unit L1 weakens or the first lens unit becomes thick and thus it becomes difficult to shorten the overall lens length. The conditional expression (1) may be replaced by the following expression:

$$4.95 < f^2/(f_1 \times Fno \times d_1) < 8.00 \quad (1a)$$

The conditional expression (2) relates to the powers of the diffractive optical element and the optical element NLF made of the solid material arranged on the object side of the intersection between the paraxial chief ray and the optical axis in the image pickup optical system L0. When the value exceeds the upper limit value (or lower limit value) in the conditional expression (2), either the power of the diffractive optical element DOE or the power of the optical element NLF made of the solid material is excessively weak (or excessively strong) or both powers are excessively weak (or excessively strong). Then, it becomes difficult to correct the longitudinal chromatic aberration with the correction of the lateral chromatic aberration in a well-balanced manner. In particular, the correction of the chromatic aberration between the g-line and the F-line becomes insufficient. The conditional expression (2) may be replaced by the following expression:

$$30 < f_{DOE} \times f_{NLF}/f^2 < 800 \quad (2a)$$

The conditional expression (3) relates to the partial dispersion ratio difference of the optical element NLF made of the solid material. The partial dispersion ratio difference of the optical element NLF made of the solid material becomes excessively high when the value exceeds the upper limit value in the conditional expression (3). This results in the overcorrection of the chromatic aberration on the short wavelength side.

On the other hand, the partial dispersion ratio difference of optical element NLF made of the solid material becomes excessively low when the value exceeds the lower limit value in the conditional expression (3). Then, the correction of the chromatic aberration on the short wavelength side becomes insufficient.

The conditional expression (3) may be replaced by the following expression:

$$0.0272 < \Delta\theta g_{FNLF} < 0.2500 \quad (3a)$$

The conditional expression (3a) may be replaced by the following expression:

$$0.0272 < \Delta\theta g_{FNLF} < 0.2000 \quad (3b)$$

Figure 10:
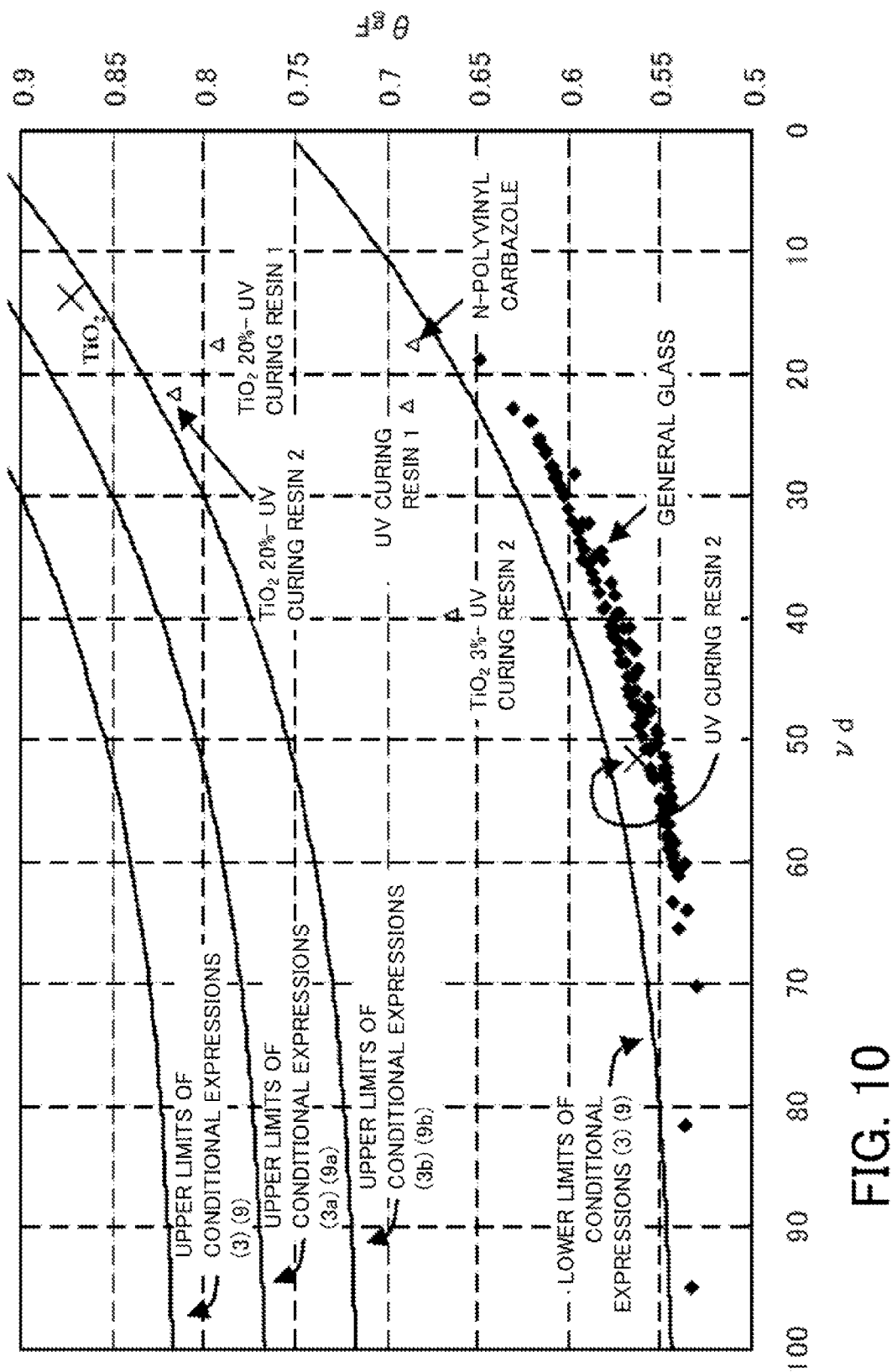
FIG. 10 is a view for explaining ranges of conditional expressions (3) and (9) according to the present invention.

FIG. 10 is an explanatory view of the optical characteristic using specific materials for the optical element NLF made of the solid material.

A concrete example of the solid material (referred to as an "optical material" hereinafter) that satisfies the conditional expression (3) is, for example, a resin. Among a wide variety of types of resins, a UV curing resin (Nd=1.635, vd=22.7, θgF=0.69) and N-polyvinyl carbazole (Nd=1.696, vd=17.7, θgF=0.69) especially are optical materials that satisfy the conditional expression (3). As long as the resin satisfies the conditional expression (3), the material is not limited to these materials.

An optical material having a characteristic different from that of a general glass material is a mixture in which the following inorganic oxide nanoparticles (inorganic particles) are distributed in a synthetic resin (transparent medium). Illustrative inorganic oxide nanoparticles are $TiO_2$ (Nd=2.304, νd=13.8), $Nb_2O_5$ (Nd=2.367, νd=14.0), ITO (Nd=1.8571, νd=5.68), $Cr_2O_3$ (Nd=2.2178, νd=13.4), $BaTiO_3$ (Nd=2.4362, νd=11.3), etc.

Among these inorganic oxides, when $TiO_2$ (Nd=2.304, νd=13.8, θgF=0.87) particles are dispersed by a proper volume ratio in the synthetic resin, the optical material that satisfies the above conditional expression (3) is obtained. $TiO_2$ is a material used for a wide variety of applications containing a deposition material that constitutes an optical thin film, such as an antireflection film, photocatalysts, white pigments, and a cosmetics material.

An average diameter of the $TiO_2$ particle dispersed in the synthetic resin may be about 2 nm to 50 nm when the influence of scattering etc. is considered, and the dispersing agent etc. may be added so as to suppress cohesions. A synthetic resin having a comparatively large partial dispersion ratio, a synthetic resin having a comparatively small Abbe number, and a synthetic resin that satisfies both conditions are suitable for the characteristic of the optical constant of the synthetic resin, and N-polyvinyl carbazole, styrene, poly methyl methacrylate (acrylic), etc. may be applied. The following embodiments utilize, but are not limited to, a UV curing resin or N-polyvinyl carbazole as a synthetic resin in which the $TiO_2$ particles are distributed.

The dispersion characteristic $N(\lambda)$ of the mixture in which the $TiO_2$ particles are distributed could be easily calculated by the following expression derived from the well-known Drude equation. That is, the refractive index $N(\lambda)$ for the wavelength $\lambda$ is given as follows:

$$N(\lambda)=[1+V\{N_{TiO}^2(\lambda)-1\}+(1-V)\{N_P^2(\lambda)-\}]^{1/2} \quad (A)$$

Herein, $\lambda$ is an arbitrary wavelength, $N_{TiO}$ is a refractive index of $TiO_2$, $N_P$ is a refractive index of the synthetic resin, and V is a ratio of the total volume of the $TiO_2$ particles to the synthetic resin volume.

As mentioned above, each embodiment provides an image pickup optical system in which a variety of aberrations containing the chromatic aberration can be easily corrected, the miniaturization of the overall optical system can be achieved, and the weight reduction of the lens weight can be realized.

In the image pickup lens of each embodiment, at least one of the following conditions may be satisfied for a smaller overall lens length and a higher optical performance. Initially, a symbol of each condition will be described.

"RM1" denotes a radius of curvature of a lens surface that is closest to the object of the second positive lens element having the meniscus shape with the convex surface on the object side in the first lens unit. "RM2" denotes a radius of curvature of a lens surface that is closest to the image of the second positive lens element having the meniscus shape with the convex surface on the object side in the first lens unit. When the second lens element includes the cemented lens, RM1 is a radius of curvature of the lens surface that contacts air closest to the object side of the cemented lens and RM2 is a radius of curvature of the lens surface that contacts air closest to the image side of the cemented lens. "$f_{12}$" denotes a synthetic focal length of the first lens unit L1 and the second lens unit L2 in focusing upon the infinitely distant object. "L" denotes a length on the optical axis from a lens surface vertex in the entire optical system that is closest to the object to the image plane.

$\phi_{PSUM}$ denotes a sum of the powers of the positive lens elements included in the first lens unit L1. $\phi_{NSUM}$ denotes a sum of the powers of the negative lens elements included in the first lens unit L1. $d_{-sp}$ is a length on the optical axis from the lens surface vertex closest to the object to the aperture diaphragm SP. $f_{NLR}$ is a focal length of the optical element NLR. $\Delta\theta g_{FNLR}$ is a partial dispersion ratio difference of the material of the optical element NLR.

$\phi_{L1i}$ denotes a power of an i-th (i=1, 2 ...) optical element (such as lens and another optical element) included in the first lens unit L1. $\Delta\theta g_{FL1i}$ denotes a partial dispersion ratio difference of a material of the i-th (i=1, 2 ...) optical element included in the first lens unit L1. $\nu_{L1i}$ is an Abbe number of the material of the i-th optical element included in the first lens unit L1. $\phi_{L33j}$ denotes the power of a j-th (j=1, 2 ...) optical element included in the third lens subunit L33. $\Delta\theta g_{FL33j}$ denotes a partial dispersion ratio difference of the material of the j-th (j=1, 2 ...) optical element included in the third lens subunit L33. $\nu_{L33j}$ denotes an Abbe number for the material of the j-th (j=1, 2 ...) optical element included in the third lens subunit L33. $\phi$ denotes a power of the entire optical system. $\Sigma$ denotes a sum, n is the number of lenses included in the first lens unit L1, and m denotes the number of lenses included in the third lens subunit L33.

$$0.01<(RM2-RM1)/(RM1+RM2)<0.70 \quad (4)$$

$$2.0<f^2/(f_{12}\times L)<10.0 \quad (5)$$

$$1.4<|\phi_{PSUM}/\phi_{NSUM}|<3.0 \quad (6)$$

$$4.0<f^2/(d_{-sp}\times L)<15.0 \quad (7)$$

$$-50.0<f_{DOE}\times f_{NLR}/f^2<-2.0 \quad (8)$$

$$0.0272<\Delta\theta g_{FNLR}<0.3000 \quad (9)$$

$$5\times10^{-4}<\sum_{i=1}^{n}\frac{\Delta\theta_{gFL1i}\times\varphi_{L1i}}{\nu_{L1i}\times\varphi}<5\times10^{-3} \quad (10)$$

$$-5\times10^{-2}<\sum_{j=1}^{m}\frac{\Delta\theta_{gFL33j}\times\varphi_{L33j}}{\nu_{L33j}\times\varphi}<-5\times10^{-4} \quad (11)$$

When the power of each lens is assumed to be T1, T2, and $\phi3$ respectively, a sum $\phi_{SUM}$ of the powers is represented as $\phi_{SUM}=\phi1+\phi2+\phi3+\ldots$.

The partial dispersion ratio difference $\Delta\theta g_{FNLR}$ is defined as follows where $N_{dNLR}$ is a refractive index to the d-line of the optical element NLR made of the solid material, $N_{gNLR}$ is a refractive index to the g-line of the optical element NLR, $N_{CNLR}$ is a refractive index to the C-line of the optical element NLR, and $N_{FNLR}$ is a refractive index to the F-line of the optical element NLR:

$$\nu_{dNLR}=(N_{dNLR}-1)/(N_{FNLR}-N_{CNLR})\theta g_{FNLR}=(N_{gNLR}-N_{FNLR})/(N_{FNLR}-N_{CNLR})$$

$$\theta g_{FBR}=-1.665\times10^{-7}\times\nu_{dNLR}^3+5.213\times10^{-5}\times\nu_{dNLR}^2-5.656\times10^{-3}\times\nu_{dNLR}+0.7278$$

$$\Delta\theta g_{FNLR}=\theta g_{FNLR}-\theta g_{FBR}$$

The partial dispersion ratio differences $\Delta\theta g_{FL1i}$ and $\Delta\theta g_{FL33j}$ are defined as follows where $N_{dL1i}$ and $N_{dL33j}$ are refractive indexes to the d-line, $N_{gL1i}$ and $N_{gL33j}$ are refractive indexes to the g-line, $N_{CL1i}$ and $N_{CL33j}$ are refractive indexes to the C-line, and $N_{FL1i}$ and $N_{FL33j}$ are refractive indexes to the F-line:

$$\Delta\theta_{gFL1i} = \theta_{gFL1i} - (-1.61783 \times 10^{-3} \times \nu_{dL1i} + 0.64146)$$

$$\Delta\theta_{gFL33j} = \theta_{gFL33j} - (-1.61783 \times 10^{-3} \times \nu_{dL33j} + 0.64146)$$

$$\nu_{dL1i} = (N_{dL1i} - 1)/(N_{FL1i} - N_{CL1i})$$

$$\nu_{dL33j} = (N_{dL33j} - 1)/(N_{FL33j} - N_{CL33j})$$

$$\theta g_{FL1i} = (N_{gL1i} - N_{FL1i})/(N_{FL1i} - N_{CL1i})$$

$$\theta g_{FL33j} = (N_{gL33j} - N_{FL33j})/(N_{FL33j} - N_{CL33j})$$

The conditional expression (4) relates to the lens shape of the second positive lens element having the meniscus shape in the first lens unit L1 (if it is a cemented lens, the cemented lens has a meniscus shape as a whole).

When the value exceeds the upper limit value in the conditional expression (4), a difference of the radius of curvature becomes excessively large between the lens surface on the object side and the lens surface on the object side of the second positive lens element. Then, the power increases and the positive power can be easily allotted. However, an angular difference between the incident light upon the lens and the exit light from the lens becomes large, the aberrational correction becomes difficult, and the spherical aberration and the coma are likely to remain. When the value exceeds the lower limit value, a difference of the radius of curvature becomes excessively small between the lens surface on the object side and the lens surface on the object side of the second positive lens element and the aberrational correction becomes difficult.

The conditional expression (4) may be replaced with the following expression:

$$0.03 < (RM2 - RM1)/(RM1 + RM2) < 0.50 \quad (4a)$$

The conditional expression (4a) may be replaced with the following expression:

$$0.03 < (RM2 - RM1)/(RM1 + RM2) < 0.45 \quad (4b)$$

The conditional expression (5) relates to a synthetic focal length between the first lens unit L1 and the second lens unit L2. When the value exceeds the upper limit value in the conditional expression (5), the synthetic power between the first lens unit L1 and the second lens unit L2 becomes excessively strong and the overall lens length is shortened. However, the spherical aberration and the coma generated from the first lens unit L1 and the second lens unit L2 increase, and it is difficult to correct these aberrations in the entire optical system. When the value exceeds the lower limit value, the synthetic power between the first lens unit L1 and the second lens unit L2 becomes excessively weak and it is thus difficult to shorten the overall lens length.

The conditional expression (5) may be replaced with the following expression:

$$2.3 < f^2/(f_{12} \times L) < 7.0 \quad (5a)$$

The conditional expression (6) relates to the synthetic power of the positive lens element and the negative lens element in the first lens unit L1. When the value exceeds the upper limit value in the conditional expression (6), the power of the positive lens element becomes excessively strong in comparison with the power of the negative lens element in the first lens unit L1. Then, it is difficult for the negative lens element to correct various aberrations containing the chromatic aberration generated in the positive lens element. In particular, the chromatic aberration between the C-line and the F-line undesirably remains. On the other hand, when the value exceeds the lower limit value, the power of the positive lens element becomes excessively weak in comparison with the power of the negative lens element in the first lens unit L1. Then, it becomes difficult to shorten the overall lens length.

The conditional expression (6) may be replaced with the following expression:

$$1.4 < |\phi_{PSUM}/\phi_{NSUM}| < 2.7 \quad (6a)$$

The conditional expression (6a) may be replaced with the following expression:

$$1.4 < |\phi_{PSUM}/\phi_{NSUM}| < 2.3 \quad (6b)$$

The conditional expression (7) relates to a position of the aperture diaphragm SP in the image pickup optical system L0. When the value exceeds the upper limit value in the conditional expression (7), the aperture diaphragm SP becomes excessively close to the object. Then, the aperture diaphragm SP is located at a position having a large axial light flux diameter, a diaphragm diameter increases, the diaphragm unit enlarges, and its weight increases.

On the other hand, when the value exceeds the lower limit value, the aperture diaphragm SP becomes excessively close to the image. Then, in an attempt to take a sufficient amount of the off-axis light flux, the lens diameter and weight of the first lens unit increase.

The conditional expression (7) may be replaced with the following expression:

$$4.5 < f^2/(d_{-sp} \times L) < 13.0 \quad (7a)$$

The conditional expression (7a) may be replaced with the following expression:

$$5.0 < f^2/(d_{-sp} \times L) < 12.0 \quad (7b)$$

The conditional expression (8) relates to a power of the diffractive optical element DOE placed on the object side of the intersection between the paraxial chief ray and the optical axis in the image pickup optical system L0 and a power of the optical element NLR placed in the image side of the intersection between the paraxial chief ray and the optical axis.

When the value exceeds the upper limit value (or lower limit value), either the power of the diffractive optical element DOE or the power of the optical element NLR made of the solid material becomes excessively strong (or excessively weak) or both powers become excessively strong (or excessively weak). Then, it is difficult to correct the longitudinal chromatic aberration and the lateral chromatic aberration in a well-balanced manner and in particular, the chromatic aberration between the g-line and the F-line remains. The conditional expression (8) may be replaced with the following expression:

$$-30.0 < f_{DOE} \times f_{NLR}/f^2 < -3.0 \quad (8a)$$

The conditional expression (9) relates to the partial dispersion ratio difference of the optical element NLR. When the value exceeds the upper limit value in the conditional expression (9), the partial dispersion ratio difference of the optical element NLR becomes excessively large. Then, it is difficult to correct the chromatic aberration. In particular, the chromatic aberration on the short wavelength side becomes overcorrected.

On the other hand, when the value exceeds the lower limit value of the conditional expression (9), the partial dispersion ratio difference of the optical element NLR becomes small. It is then difficult to correct the chromatic aberration. In particular, the correction of the chromatic aberration on the short wavelength side runs short.

The conditional expression (9) may be replaced with the following expression:

$$0.0272 < \Delta\theta g_{FNLR} < 0.2500 \quad (9a)$$

The conditional expression (9a) may be replaced with the following expression:

$$0.0272 < \Delta\theta g_{FNLR} < 0.2000 \qquad (9b)$$

The concrete example of the solid material that satisfies the conditional expression (9) is similar to the solid material that satisfies the conditional expression (3), and the optical characteristic is illustrated in FIG. 10.

The conditional expression (10) relates to the correction of the chromatic aberration of the first lens unit L1. When the value exceeds the upper or lower limit value in the conditional expression (10), it becomes difficult to correct the longitudinal chromatic aberration between the g-line and F-line and the longitudinal chromatic aberration between the C-line and the F-line in a well-balanced manner and the longitudinal chromatic aberration remains as a whole. The conditional expression (10) may be replaced with the following expression:

$$7 \times 10^{-4} < \sum_{i=1}^{n} \frac{\Delta\theta_{gFL1i} \times \varphi_{L1i}}{v_{L1i} \times \varphi} < 4 \times 10^{-3} \qquad (10a)$$

The conditional expression (11) relates to the correction of the chromatic aberration of the third lens subunit L33. When the value exceeds the upper or lower limit value in the conditional expression (11), it becomes difficult to correct the longitudinal chromatic aberration between the g-line and F-line and the longitudinal chromatic aberration between the C-line and the F-line in a well-balanced manner and the longitudinal chromatic aberration remains as a whole. The conditional expression (11) may be replaced with the following expression:

$$-3.5 \times 10^{-2} < \sum_{j=1}^{m} \frac{\Delta\theta_{gFL33j} \times \varphi_{L33j}}{v_{L33j} \times \varphi} < -7.5 \times 10^{-4} \qquad (11a)$$

Thus, each embodiment correct the chromatic aberration over the screen, and easily provide an image pickup optical system with a high optical performance.

Next follows a description of the characteristic of the lens configuration of each embodiment. Each lens designated by the same reference numeral corresponds to the aforementioned lens. Initially, a common lens configuration in each embodiment will be described. Each embodiment provides, in order from the object side, the first lens unit L1 having a positive power, the second lens unit L2 having a positive or negative power, and the third lens unit L3 having a positive or negative power. The aperture diaphragm SP is located on the image side of the first lens unit L1. The third lens unit L3 includes the first lens subunit L31 having a positive or negative power, the second lens subunit L32 having a negative power, and the third lens subunit L33 having a positive power.

Blurs of a captured image generated when the image pickup optical system L0 vibrates are corrected (compensations of the oscillation) by moving the second lens subunit L32 as a movable lens unit (image displacement correcting unit) in a direction orthogonal to the optical axis as illustrated by an arrow LT.

Next follows a description of the configuration of the diffractive optical element DOE used for the image pickup optical system L0 of each embodiment. The diffractive grating used for each embodiment is a well-known single-layer or multi-layer type diffractive grating. The diffractive optical part D of the diffractive optical element DOE in the image pickup optical system L0 includes a diffractive grating that is rotationally symmetrical with respect to the optical axis. The diffractive optical element DOE has a diffractive grating (diffractive optical part) D that includes one or more layers on a (transparent) substrate. The optical material of the diffractive grating is an ultraviolet curing resin (refractive index nd=1.513 and Abbe number vd=51.0).

The grating thickness of the grating part of the diffractive grating is set to 1.03 μm for a single layer so that the diffraction efficiency of the +1st order diffracted light as the designed order becomes highest. In other words, the designed order is +1st order and the designed wavelength is the wavelength of 530 nm.

Each embodiment may use a diffractive optical element of a layered type in which a plurality of diffractive gratings are made of different materials. The diffractive optical element of the layered type includes a first diffractive grating made, for example, of an ultraviolet curing resin (refractive index nd=1.499 and Abbe number vd=54) formed on a substrate, and a second diffractive grating (refractive index nd=1.598 and Abbe number vd=28) formed on the first diffractive grating. In the combination of these materials, the grating thickness d1 of the grating part of the first diffractive grating is set to d1=13.8 μm, and the grating thickness d2 of the grating part of the second diffractive grating is set to d2=10.5 μm.

The diffractive optical element having a diffractive grating of a layered structure provides a high diffraction efficiency of 95% or higher over the working wavelength (which is a visible range) in the diffracted light of the designed order.

While each embodiment provides a diffractive optical part on the optical surface, the base may be spherical, plane, or aspheric. The diffractive optical part may be produced as a replica by a method for adding a plastic or another film as the diffractive optical part (diffractive surface) to an optical surface of the base. A phase $\phi(H)$ as a shape of the diffractive grating is expressed by the following expression where $C_{2i}$ is a phase coefficient of the 2i-th order term, H is a distance from the optical axis, m is a diffractive order, and $\lambda_0$ is a reference wavelength:

$$\phi(H) = \left(2\pi \frac{m}{\lambda_0}\right) \cdot (C_2 \cdot H^2 + C_4 \cdot H^4 + C_6 \cdot H^6 \ldots + C_{2i} \cdot H^{2i}) \qquad (a)$$

In general, when $N_d$, $N_C$, and $N_F$ are refractive powers to the wavelengths of the d-line, the C-line, and the F-line, the Abbe number (dispersion value) $v_d$ of the refractive optical material, such as a lens and a prism is expressed by the following expression:

$$v_d = (N_d - 1)/(N_F - N_C) > 0 \qquad (b)$$

The Abbe number $v_d$ of the diffractive optical part is expressed as follows where $\lambda_d$, $\lambda_C$, and $\lambda_F$ are wavelengths of the d-line, the C-line, and the F-line, and $v_d = -3.45$:

$$v_d = \lambda_d/(\lambda_F - \lambda_C) \qquad (c)$$

As a result, the dispersion characteristic at an arbitrary wavelength has an operation reverse to the dioptric optical element. The power $\phi_D$ of the diffractive optical part to paraxial first order diffracted light (m=1) at the reference wavelength is expressed as $\phi_D = -2 \cdot C_2$ where $C_2$ is a second order coefficient from the above expression (a) representing the phase of the diffractive optical part D.

Thereby, the focal length $f_{DOE}$ only of the diffraction component of the diffractive optical element DOE is expressed as follows:

$$f_{DOE} = \frac{1}{\phi_D} = -\frac{1}{2 \cdot C_2}$$

Where λ is an arbitrary wavelength and $\lambda_0$ is a reference wavelength, the power change of the arbitrary wavelength to the reference wavelength is expressed as follows:

$$\phi_D' = (\lambda/\lambda_0) \times (-2 \cdot C_2) \tag{d}$$

As a result, a high dispersion performance for a small paraxial refractive index change can be obtained as a characteristic of the diffractive optical part D by changing a phase coefficient $C_2$ in the above expression (a). This means that the chromatic aberration can be corrected without any significant influences upon a variety of aberrations other than the chromatic aberration. For a high-order coefficient after a phase coefficient $C_4$, a power change to a change of the ray incident height of the diffractive optical part D can provide an effect similar to that of the aspheric surface. At the same time, a refractive power change with an arbitrary wavelength can be provided relative to the reference wavelength as the ray incident height changes. Therefore, this is effective to the correction of the lateral chromatic aberration.

Like the image pickup optical system L0 of each embodiment, the diffractive optical element DOE arranged on a surface distant from the optical axis, which an axial ray passes a lens surface, is effective to the correction of the longitudinal chromatic aberration.

Next follows a description of a detailed configuration of each embodiment.

FIRST EMBODIMENT

A description will be given of a lens configuration of the image pickup optical system L0 according to a first embodiment illustrated in FIG. 1A. The first lens unit L1 includes three positive lens elements, one optical element NLF made of a solid material, and one negative lens element. A cemented lens is included in the first lens unit L1. The cemented lens includes part of the diffractive optical element DOE. The diffractive optical part D of the diffractive optical element DOE is arranged on the cemented lens surface of the cemented lens. The optical element NLF made of the solid material is arranged on the cemented surface of the cemented lens.

The second positive lens element having a meniscus shape corresponding to the conditional expression (4) is the second positive lens element counted in order from the object side. Each of the positive lens element closest to the object of the first lens unit L1 and the lens surface on the object side of the cemented lens has an aspheric shape. The second lens unit L2 includes the cemented lens made of the positive lens element and the negative lens element.

The first lens subunit L31 of the third lens unit L3 includes two cemented lenses each of which includes a positive lens element and a negative lens element. The second lens subunit L32 includes one cemented lens that includes a positive lens element and a negative lens element, and one negative lens element. The second lens subunit L32 has such an image stabilization function that it moves in a direction having a component of the direction perpendicular to the optical axis so as to displace the imaging position in a direction perpendicular to the optical axis.

The third lens subunit L33 includes one positive lens element and two sets of cemented lenses. The optical element NLR made of the solid material is arranged on a cemented lens surface of the cemented lens on the image side among the two sets of cemented lenses. Each of a lens surface on the object side of the positive lens element closest to the object in the third lens subunit L33, and a surface on the image side of the cemented lens of the object side among the two sets of cemented lenses in the third lens subunit L33 has an aspheric surface. Focusing from the infinitely distant object to the short-range object is performed by moving the second lens unit L2 to the image plane side on the optical axis.

SECOND EMBODIMENT

A description will be given of a lens configuration of the image pickup optical system L0 according to a second embodiment illustrated in FIG. 2A. The first lens unit L1 includes four positive lens elements, one optical element NLF made of a solid material, and one negative lens element. Two cemented lenses are included in the first lens unit L1. The cemented lens on the object side among these two cemented lenses includes two positive lens elements and constitutes the diffractive optical element DOE. The diffractive optical part D of the diffractive optical element DOE is arranged on the cemented lens surface of the cemented lens.

The optical element NLF made of the solid material is arranged on the cemented surface of the cemented lens that is located on the image side and includes a negative lens element and a positive lens element. The second positive lens element having a meniscus shape corresponding to the conditional expression (4) is the third positive lens element counted in order from the object side. A lens surface contacting air on the object side of each of the cemented lens and single lens is aspheric in the first lens unit L1. The second lens unit L2 includes the cemented lens made of the positive lens element and the negative lens element.

The first lens subunit L31 of the third lens unit L3 includes two cemented lenses, each of which includes a positive lens element and a negative lens element. The second lens subunit L32 has an image stabilization function, and includes one cemented lens made of a positive lens and a negative lens, and one negative lens element. The third lens subunit L33 includes one positive lens element and two sets of cemented lenses. The optical element NLR made of the solid material is arranged on the cemented lens surface of the cemented lens on the image side among the two sets of cemented lenses.

In the third lens subunit L33, each of a lens surface on the object side of the positive lens element, and a lens surface on the image side of the cemented lens of the object side among the two sets of cemented lenses is aspheric. Focusing from the infinitely distant object to the short-range object is performed by moving the second lens unit L2 to the image plane side on the optical axis.

THIRD EMBODIMENT

Figure 3A:
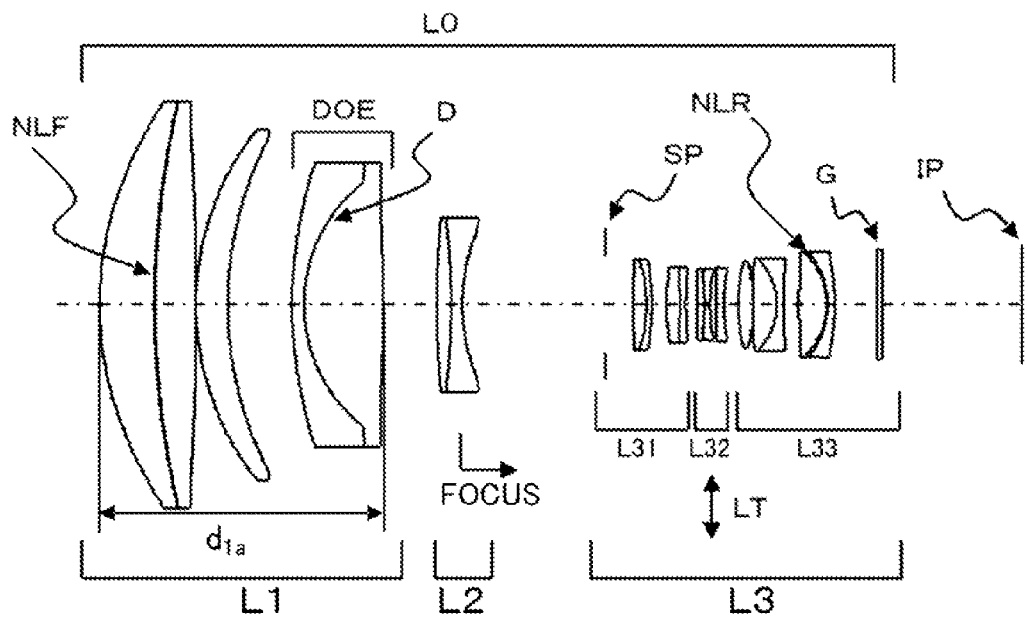
FIG. 3A is a lens sectional view of an image pickup optical system according to a third embodiment and FIG. 3B is its aberrational diagram.
Figure 3B:
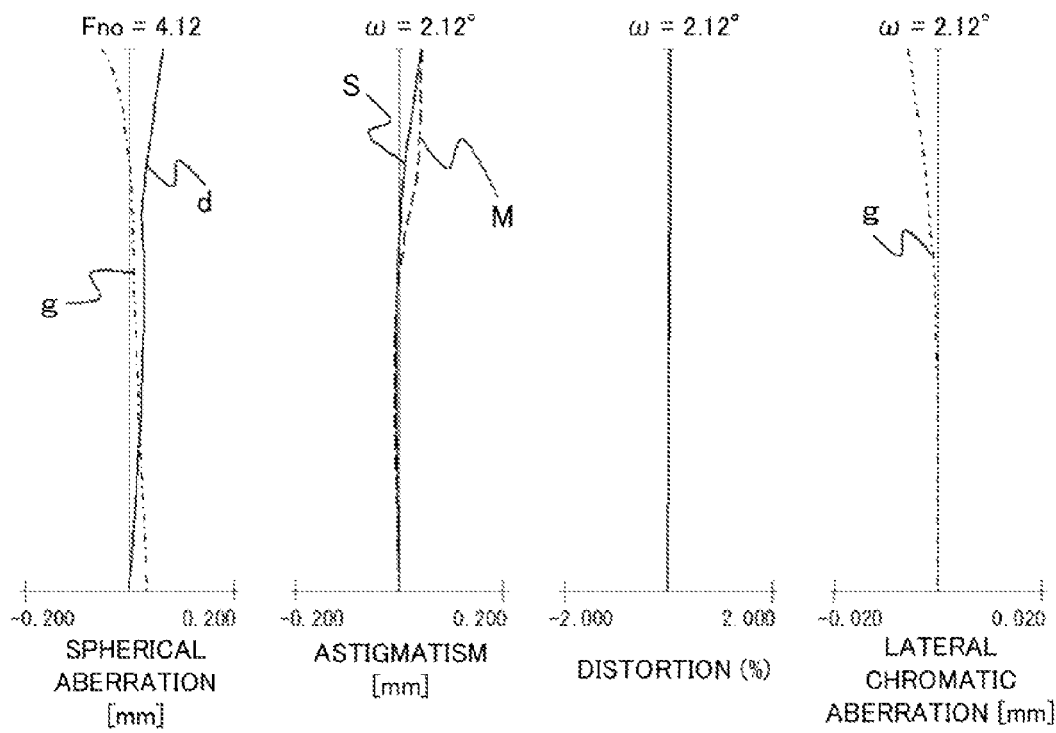

A description will be given of a lens configuration of the image pickup optical system L0 according to a third embodiment illustrated in FIG. 3A. The first lens unit L1 includes four positive lens elements, one optical element NLF made of a solid material, and one negative lens element. Two cemented lenses are included in the first lens unit L1. The optical element NLF made of the solid material is arranged on the cemented surface of the cemented lens including two positive lens elements on the object side. The cemented lens on the image side including a positive lens element and a negative lens element constitutes the diffractive optical element DOE. The diffractive optical part D of the diffractive optical element DOE is arranged on the cemented lens surface of this cemented lens.

The second positive lens element having a meniscus shape corresponding to the conditional expression (4) is the third positive lens element counted in order from the object side. A lens surface contacting air on the object side of each of the cemented lens and single lens is aspheric in the first lens unit L1. The second lens unit L2 includes the cemented lens made of the positive lens element and the negative lens element.

The first lens subunit L31 in the third lens unit L3 includes two cemented lenses, each of which includes a positive lens element and a negative lens element. The second lens subunit L32 has an image stabilization function, and includes one cemented lens of a positive lens and a negative lens, and one negative lens element. The third lens subunit L33 includes one positive lens element and two sets of cemented lenses. The optical element NLR made of the solid material is arranged on the cemented lens surface of the cemented lens on the image side among the two sets of cemented lenses. In the third lens subunit L33, each of a lens surface on the object side of the positive lens element, and a surface on the image side of the cemented lens of the object side among the two sets of cemented lenses is aspheric. Focusing from the infinitely distant object to the short-range object is performed by moving the second lens unit L2 to the image plane side on the optical axis.

FOURTH EMBODIMENT

Figure 4A:
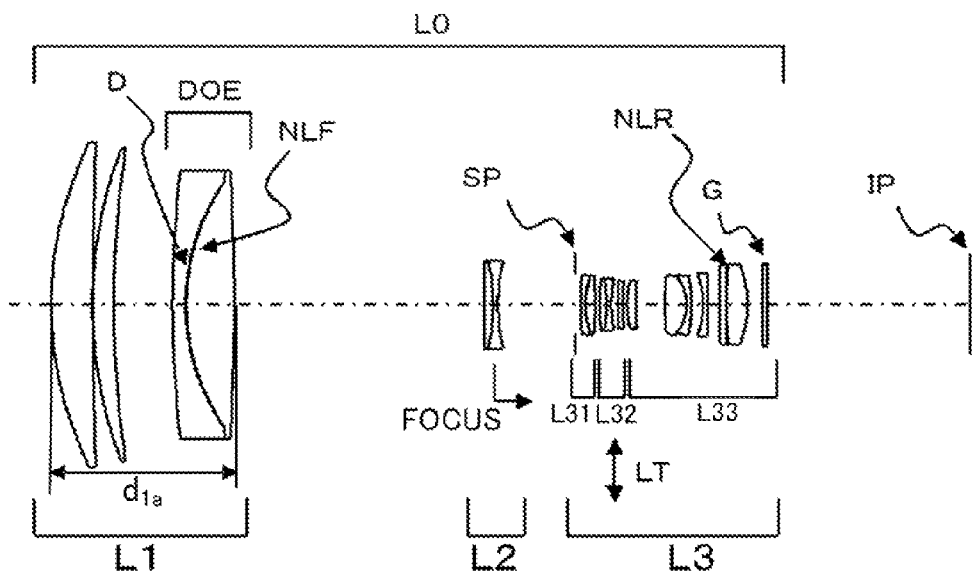
FIG. 4A is a lens sectional view of an image pickup optical system according to a fourth embodiment and FIG. 4B is its aberrational diagram.
Figure 4B:
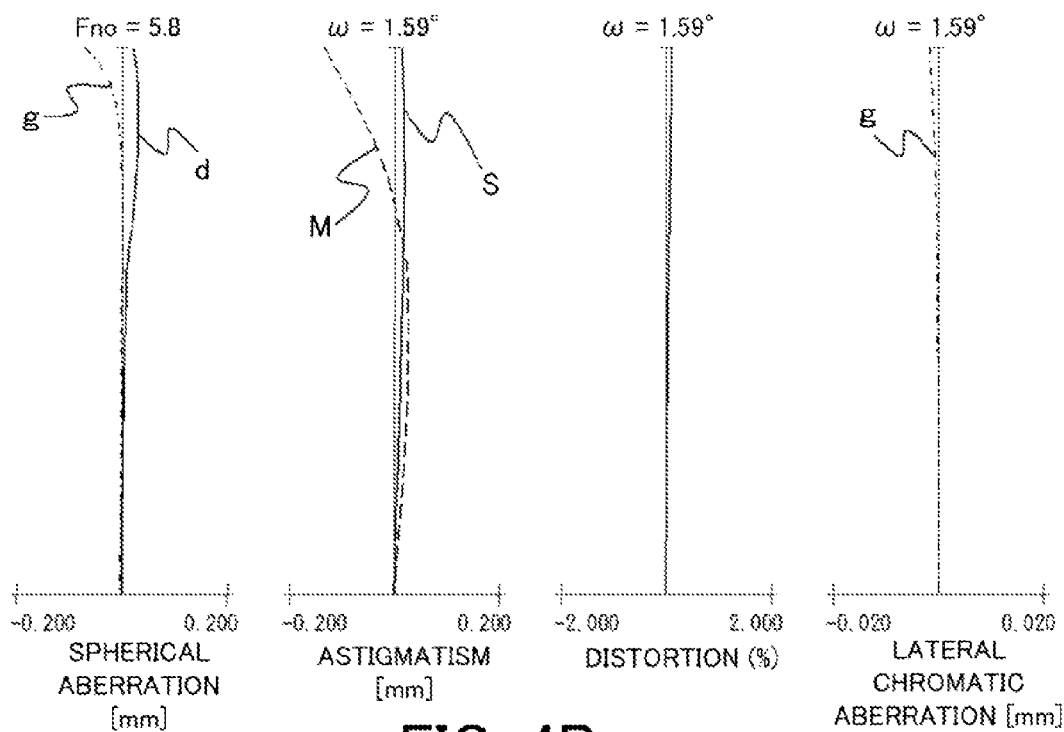

A description will be given of a lens configuration of the image pickup optical system L0 according to a fourth embodiment illustrated in FIG. 4A. The first lens unit L1 includes three positive lens elements, one optical element NLF made of a solid material, and one negative lens element. One cemented lenses is included in the first lens unit L1. The cemented lens constitutes the diffractive optical element DOE. The diffractive optical part D of the diffractive optical element DOE is arranged on the cemented lens surface of this cemented lens. The optical element NLF made of the solid material is arranged on the cemented lens surface of the cemented lens.

The second positive lens element having a meniscus shape corresponding to the conditional expression (4) is the second positive lens element counted in order from the object side. A lens surface contacting air on the object side of each of the cemented lens and single lens is aspheric in the first lens unit L1. The second lens unit L2 includes the cemented lens made of the positive lens element and the negative lens element.

The first lens subunit L31 of the third lens unit L3 includes a cemented lens that includes a positive lens element and a negative lens element. The second lens subunit L32 has an image stabilization function, and includes one cemented lens of a positive lens and a negative lens, and one negative lens element.

The third lens subunit L33 includes one positive lens element, one negative lens element, and two sets of cemented lenses. The optical element NLR made of the solid material is arranged on the cemented lens surface of the cemented lens on the image side among the two sets of cemented lenses. A lens surface on the object side of the positive lens element closest to the object is aspheric in the third lens subunit L33. Focusing from the infinitely distant object to the short-range object is performed by moving the second lens unit L2 to the image plane side on the optical axis.

FIFTH EMBODIMENT

Figure 5A:
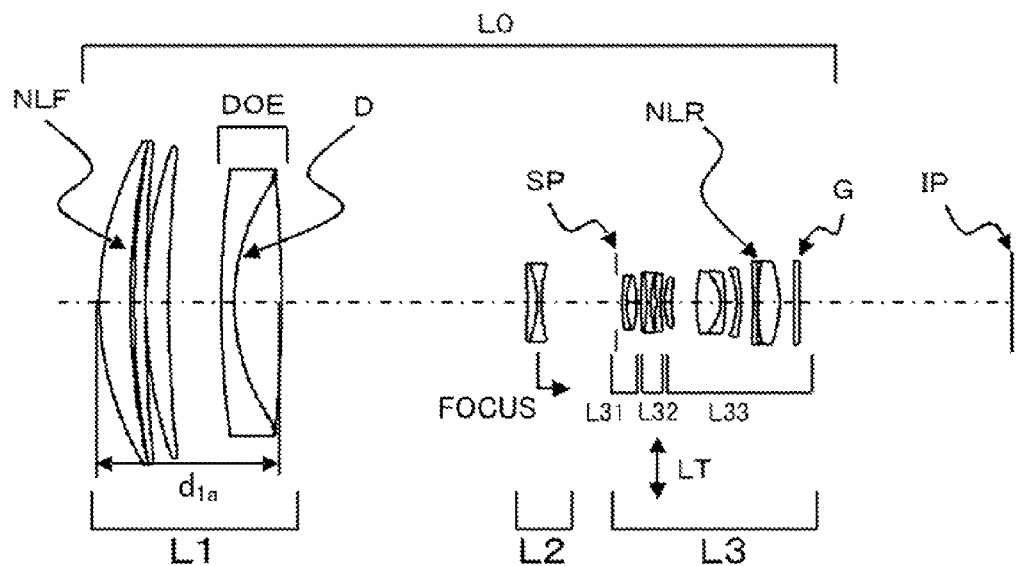
FIG. 5A is a lens sectional view of an image pickup optical system according to a fifth embodiment and FIG. 5B is its aberrational diagram.
Figure 5B:
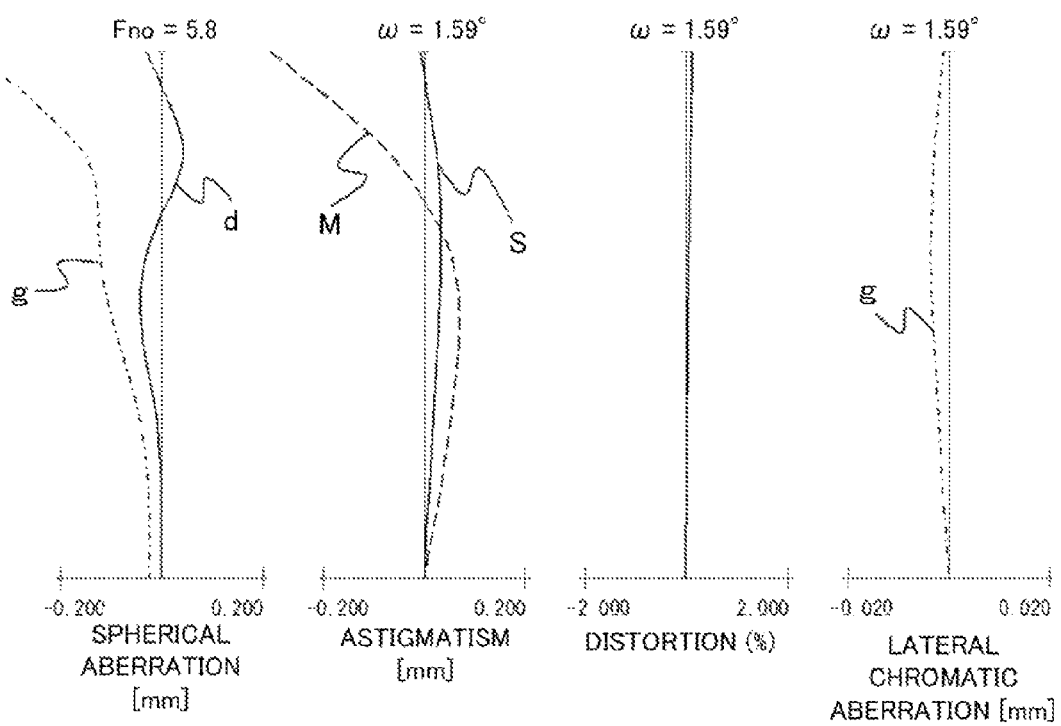

A description will be given of a lens configuration of the image pickup optical system L0 according to a fifth embodiment illustrated in FIG. 5A. The first lens unit L1 includes four positive lens elements, one optical element NLF made of a solid material, and one negative lens element. Two cemented lenses are included in the first lens unit L1. The optical element NLF made of the solid material is arranged on the cemented surface of the cemented lens including two positive lens elements on the object side. The cemented lens on the image side including a positive lens element and a negative lens element constitutes the diffractive optical element DOE. The diffractive optical part D of the diffractive optical element DOE is arranged on the cemented lens surface of this cemented lens.

The second positive lens element having a meniscus shape corresponding to the conditional expression (4) is the third positive lens element counted in order from the object side. A lens surface contacting air on the object side of each of the cemented lens and single lens is aspheric in the first lens unit L1. The second lens unit L2 includes the cemented lens made of the positive lens element and the negative lens element.

The first lens subunit L31 of the third lens unit L3 includes a cemented lens including a positive lens element and a negative lens element. The second lens subunit L32 has an image stabilization function, and includes one cemented lens of a positive lens and a negative lens, and one negative lens element. The third lens subunit L33 includes one positive lens element, one negative lens, and two sets of cemented lenses. The optical element NLR made of the solid material is arranged on the cemented lens surface of the cemented lens on the image side among the two sets of cemented lenses.

A lens surface on the object side of the positive lens element which is closest to the object in the third lens subunit L33 is aspheric. Focusing from the infinitely distant object to the short-range object is performed by moving the second lens unit L2 to the image plane side.

SIXTH EMBODIMENT

Figure 6A:
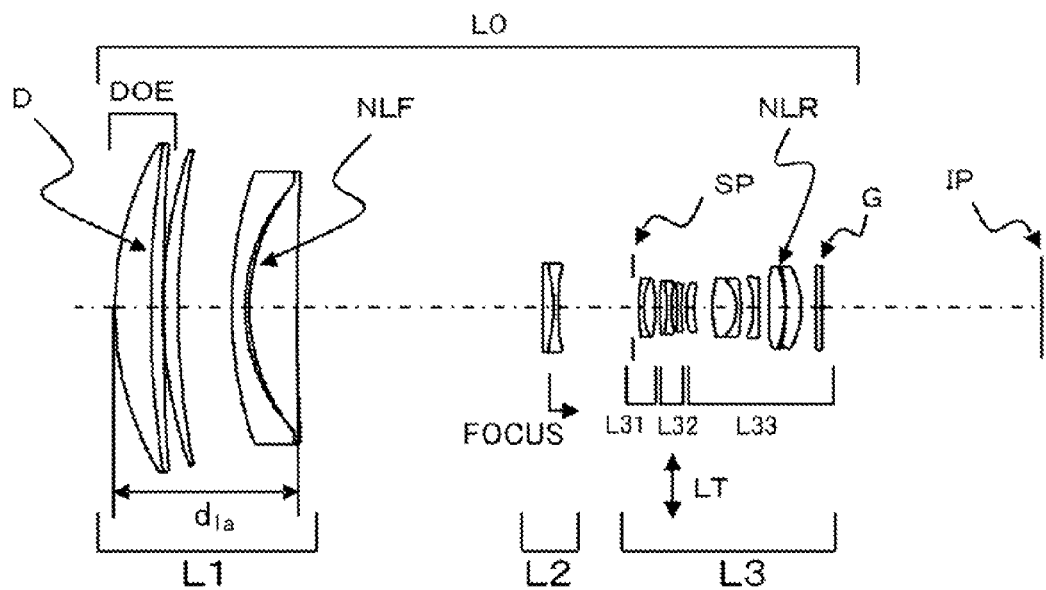
FIG. 6A is a lens sectional view of an image pickup optical system according to a sixth embodiment and FIG. 6B is its aberrational diagram.
Figure 6B:
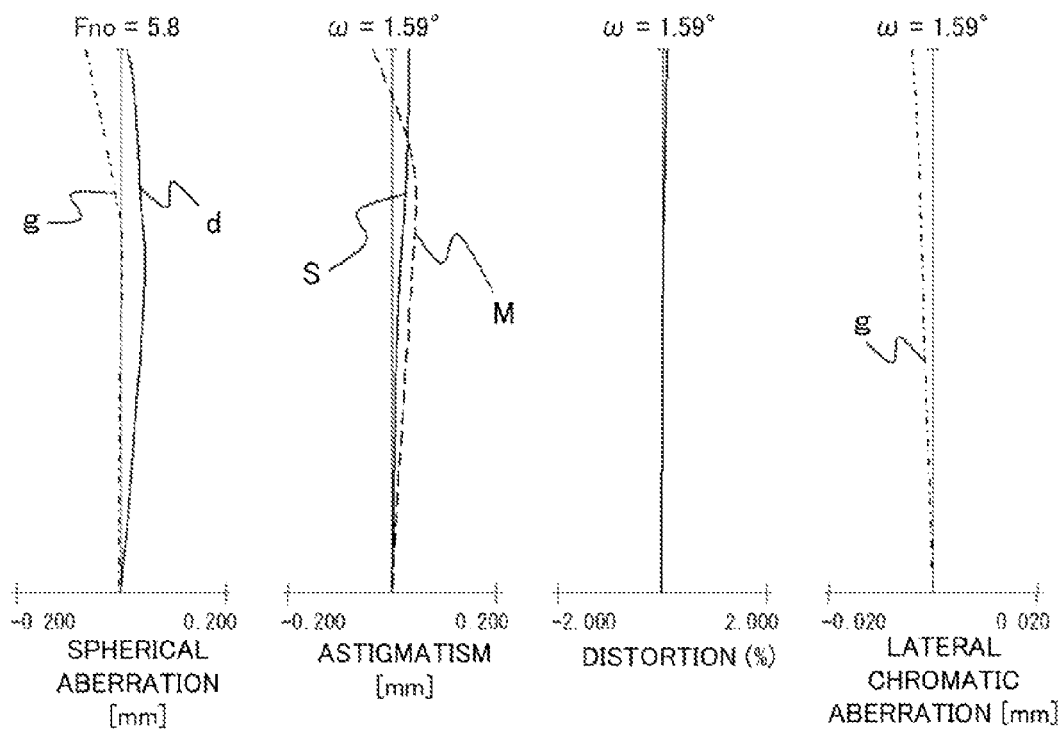

A description will be given of a lens configuration of the image pickup optical system L0 according to a sixth embodiment illustrated in FIG. 6A. The first lens unit L1 includes four positive lens elements, one optical element NLF made of a solid material, and one negative lens element. Two cemented lenses are included in the first lens unit L1. The cemented lens including two positive lens elements on the object side constitutes the diffractive optical element DOE. The diffractive optical part D of the diffractive optical element DOE is arranged on the cemented lens surface of this cemented lens. The optical element NLF is arranged on the cemented lens surface of the cemented lens that is located on the image side and includes a positive lens element and a negative lens element.

The second positive lens element having a meniscus shape corresponding to the conditional expression (4) is the third positive lens element counted in order from the object side. A lens surface on the object side of the single lens (which is the third positive lens element counted in order from the object side) is aspheric in the first lens unit L1. The second lens unit L2 includes the cemented lens made of the positive lens element and the negative lens element.

The first lens subunit L31 in the third lens unit L3 includes a cemented lens including a negative lens element and a positive lens element. The second lens subunit L32 has an image stabilization function, and includes one cemented lens made of a positive lens and a negative lens, and one negative lens element. The third lens subunit L33 includes one positive lens element, one negative lens, and two sets of cemented lenses.

The optical element NLR made of the solid material is arranged on the cemented lens surface of the cemented lens on the image side among the two sets of cemented lenses. In the third lens subunit L33, each of a lens surface on the object side of the positive lens element, a lens surface on the object side of the negative lens element, and a lens surface on the image side of the cemented lens on the image side among the two sets of cemented lenses is aspheric. Focusing from the infinitely distant object to the short-range object is performed by moving the second lens unit L2 to the image plane side.

SEVENTH EMBODIMENT

Figure 7A:
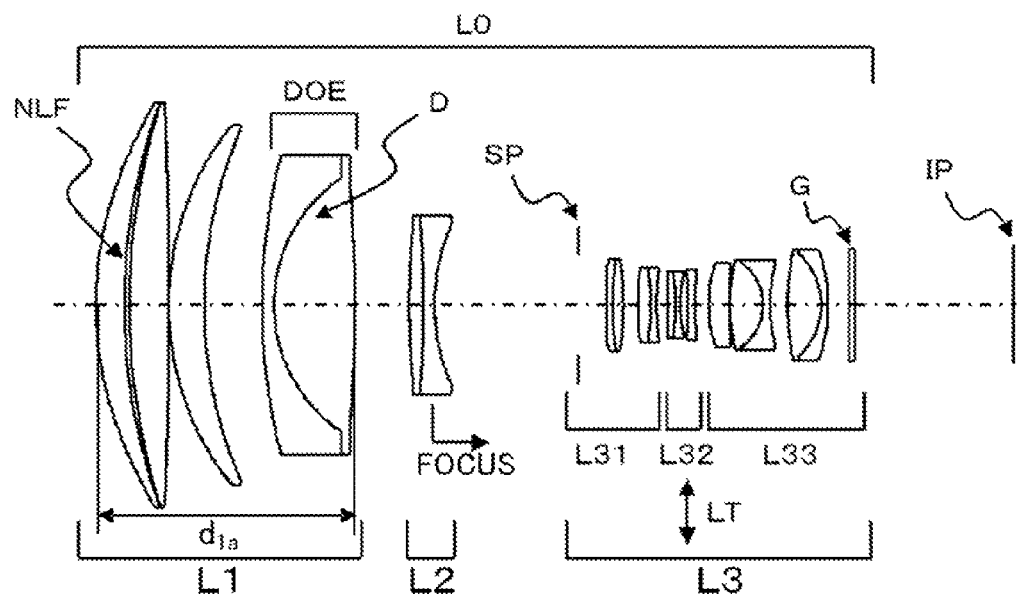
FIG. 7A is a lens sectional view of an image pickup optical system according to a seventh embodiment and FIG. 7B is its aberrational diagram.
Figure 7B:
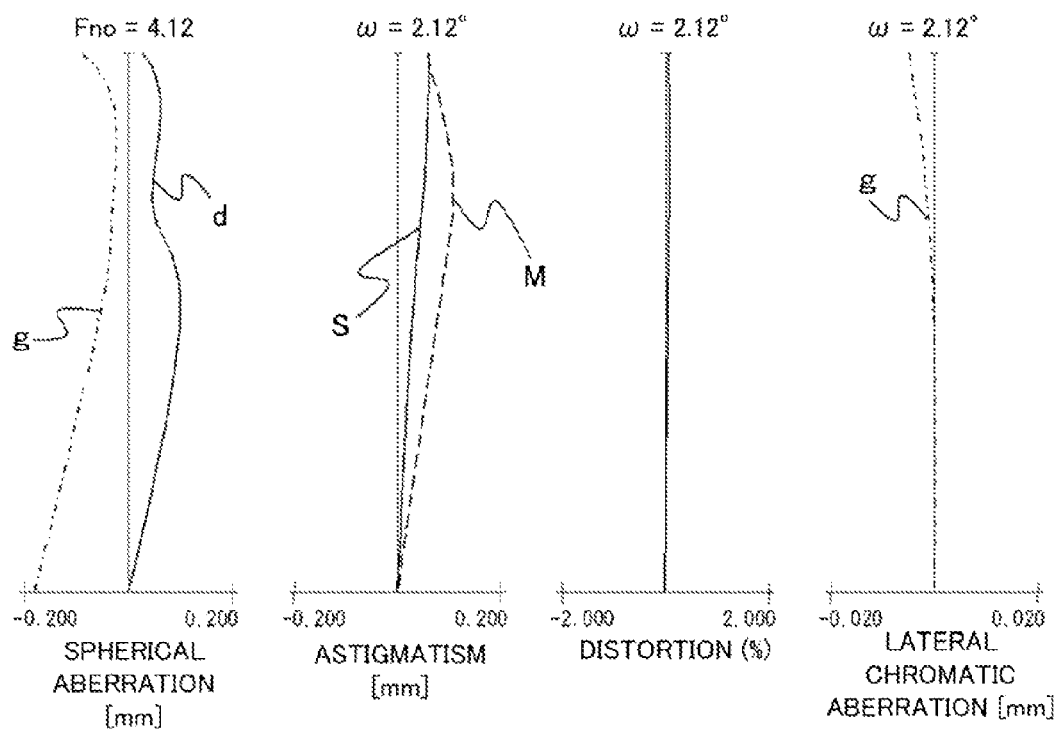

A description will be given of a lens configuration of the image pickup optical system L0 according to a seventh embodiment illustrated in FIG. 7A. The first lens unit L1 includes four positive lens elements, one optical element NLF made of a solid material, and one negative lens element. Two cemented lenses are included. The optical element NLF is arranged on the cemented lens surface of the cemented lens including two positive lens elements on the object side. The cemented lens on the image side including a positive lens element and a negative lens element constitutes the diffractive optical element DOE. The diffractive optical part D of the diffractive optical element DOE is arranged on the cemented lens surface of this cemented lens.

The second positive lens element having a meniscus shape corresponding to the conditional expression (4) is the third positive lens element counted in order from the object side. A lens surface contacting air on the object side of each of the cemented lens and single lens is aspheric in the first lens unit L1. The second lens unit L2 includes the cemented lens made of the positive lens element and the negative lens element.

The first lens subunit L31 of the third lens unit L3 includes two sets of cemented lenses each of which includes a positive lens element and a negative lens element. The second lens subunit L32 has an image stabilization function, and includes one cemented lens of a positive lens and a negative lens, and one negative lens element. The third lens subunit L33 includes one positive lens element, and two sets of cemented lenses. In the third lens subunit L33, each of the lens surface on the object side of the positive lens that is closest to the object and lens surface on the image side of the cemented lens that is closest to the object among the two sets of cemented lenses is aspheric. This embodiment does not include the optical element NLR.

Focusing from the infinitely distant object to the short-range object is performed by moving the second lens unit L2 to the image plane side.

EIGHTH EMBODIMENT

A description will be given of a lens configuration of the image pickup optical system L0 according to an eighth embodiment illustrated in FIG. 8A. The first lens unit L1 includes three positive lens elements, one optical element NLF made of a solid material, and one negative lens element. One cemented lenses is included in the first lens unit L1. The cemented lens constitutes the diffractive optical element DOE. The diffractive optical part D of the diffractive optical element DOE is arranged on the cemented lens surface of this cemented lens. The optical element NLF made of the solid material is arranged on the cemented lens surface of the cemented lens.

The second positive lens element having a meniscus shape corresponding to the conditional expression (4) is the second positive lens element counted in order from the object side. A lens surface on the object side contacting air of each of the cemented lens and the single lens is aspheric in the first lens unit L1. The second lens unit L2 includes two sets of cemented lenses each of which includes a positive lens element and a negative lens element. The lens surface on the object side of the cemented lens of the image side among the two sets of cemented lenses is aspheric.

The first lens subunit L31 of the third lens unit L3 includes a cemented lens including a positive lens element and a negative lens element. The second lens subunit L32 has an image stabilization function, and includes one cemented lens made of a positive lens and a negative lens, and one negative lens element. The third lens subunit L33 includes one positive lens element, and two sets of cemented lenses. The optical element NLR made of the solid material is arranged on the cemented lens surface of the cemented lens on the image side among the two sets of cemented lenses. A lens surface on the object side of the positive lens element that is closest to the object has an aspheric surface in the third lens subunit L33.

Focusing from the infinitely distant object to the short-range object is performed by moving the third lens unit L3 to the image plane side.

A description will now be given of numerical examples 1 to 8 corresponding to the first to eight embodiments. In each numerical example, "i" denotes an order of a surface counted from the object side. "$r_i$" is a radius of curvature of an i-th surface from the object side. "$d_i$" is an interval between the i-th surface and the (i+1)-th surface from the object side. $n_{di}$ and $\nu_{di}$ are the refractive index and the Abbe number of the i-th optical element. θgFi and ΔθgFi are a partial dispersion ratio and a partial dispersion ratio difference of the i-th optical element. The focal length f, the F-number FNo, and the angle of view 2ω (degree) are values in focusing upon the infinitely distant object. BF is a back focus.

In each numerical example, two surfaces that are closer to the image are optical blocks and provided for designs for the filter, etc. The diffractive optical element (diffraction surface) is expressed by giving a phase coefficient of a phase function of the above (a) expression. An aspheric shape is expressed as follows where the X axis is set to the optical axis direction, the H axis is the perpendicular direction to the optical axis, a light traveling direction is positive, R is a paraxial radius of curvature, k is an eccentricity, A4, A6, A8, A10, and A12 are assumed to be aspheric coefficients:

$$X = \frac{\left(\frac{H^2}{R}\right)}{\left\{1+\sqrt{1-(1+k)\cdot\left(\frac{H}{R}\right)^2}\right\}} +$$

$$A4\cdot H^4 + A6\cdot H^6 + A8\cdot H^8 + A10\cdot H^{10} + A12\cdot H^{12}$$

For example, an expression "e-Z" means "10-Z."

Numerical Example 1

| | f = 585.00 mm Fno = 4.12 2ω = 4.24 | | | | | | | |
|---|---|---|---|---|---|---|---|---|
| surface number | r | d | nd | vd | effective diameter | θgF | ΔθgF | |
| 1(aspheric surface) | 140.065 | 26.27 | 1.51633 | 64.1 | 141.99 | 0.53416 | −0.00353 | |
| 2 | −692.796 | 0.10 | | | 140.40 | | | |
| 3(aspheric surface) | 93.243 | 13.86 | 1.80518 | 25.4 | 123.43 | 0.61655 | 0.01623 | |
| 4 | 128.946 | 19.22 | | | 118.60 | | | |
| 5(aspheric surface) | 184.480 | 4.20 | 1.76182 | 26.5 | 104.04 | 0.61330 | 0.01473 | |
| 6 | 51.430 | 1.80 | 1.63555 | 22.7 | 85.91 | 0.68947 | 0.08477 | NLF |
| 7(diffraction) | 53.514 | 27.39 | 1.43875 | 94.9 | 85.78 | 0.53463 | 0.04681 | |
| 8 | −2753.616 | 19.24 | | | 82.41 | | | |
| 9 | 553.740 | 5.00 | 1.80809 | 22.8 | 63.26 | | | |
| 10 | −255.073 | 4.00 | 1.74950 | 35.3 | 62.07 | | | |
| 11 | 73.100 | 51.28 | | | 55.58 | | | |
| 12(diaphragm) | ∞ | 10.00 | | | 37.71 | | | |
| 13 | 285.701 | 2.00 | 1.75520 | 27.5 | 33.61 | | | |
| 14 | 56.991 | 5.52 | 1.62588 | 35.7 | 32.56 | | | |
| 15 | −114.175 | 5.00 | | | 32.06 | | | |
| 16 | 135.793 | 5.00 | 1.51742 | 52.4 | 27.88 | | | |
| 17 | −78.425 | 2.00 | 1.88300 | 40.8 | 26.40 | | | |
| 18 | 270.207 | 4.00 | | | 25.37 | | | |
| 19 | 41301.568 | 2.81 | 1.84666 | 23.8 | 24.72 | | | |
| 20 | −101.906 | 1.70 | 1.77250 | 49.6 | 24.66 | | | |
| 21 | 60.040 | 2.47 | | | 24.51 | | | |
| 22 | −710.645 | 2.50 | 1.77250 | 49.6 | 24.79 | | | |
| 23 | 73.646 | 5.91 | | | 25.38 | | | |
| 24(aspheric surface) | 40.719 | 4.45 | 1.52249 | 59.8 | 29.98 | 0.54348 | −0.00127 | |
| 25 | 152.850 | 9.51 | | | 30.06 | | | |
| 26 | 90.268 | 10.90 | 1.65412 | 39.7 | 31.67 | 0.57403 | −0.00322 | |
| 27 | −22.137 | 2.50 | 1.88300 | 40.8 | 31.54 | 0.56694 | −0.00857 | |
| 28(aspheric surface) | 448.097 | 4.81 | | | 33.39 | | | |
| 29 | −1102.426 | 2.00 | 1.63854 | 55.4 | 35.34 | 0.54900 | −0.00286 | |
| 30 | 117.543 | 0.10 | 1.70877 | 21.6 | 36.33 | 0.81721 | 0.21074 | NLR |
| 31 | 65.222 | 7.45 | 1.76182 | 26.5 | 36.67 | 0.61330 | 0.01473 | |
| 32 | −91.649 | 15.00 | | | 37.33 | | | |
| 33 | ∞ | 2.00 | 1.51633 | 64.1 | 38.80 | | | |
| 34 | ∞ | | | | 38.92 | | | |

A value of ΔθgF, as used herein, is defined as follows:

$$\Delta\theta gF = \theta gF - (-1.61783 \times 10^{-3} \times vd + 0.64146)$$

aspheric data first surface

K = −2.67344e−001  A4 = −2.99075e−008  A6 = −3.07516e−012
A8 = −1.95984e−016  A10 = 1.38616e−020 third surface

K = 6.33596e−002  A4 = 7.05206e−009  A6 = 2.03582e−012
A8 = 6.14289e−016  A10 = −4.02103e−020  A12 = 2.62608e−023 fifth surface

K = −5.28501e−001  A4 = −6.08638e−009  A6 = 5.77225e−012
A8 = 5.99011e−016  A10 = −4.68523e−019  A12 = 7.19425e−023 twenty fourth surface

K = 2.40326e+000  A4 = −2.37222e−006  A6 = −3.78783e−009
A8 = 1.34349e−011  A10 = −5.78041e−014  A12 = 4.20953e−017 twenty eighth surface

K = −3.00129e+002  A4 = 1.20966e−007  A6 = −1.36320e−010
A8 = 1.91412e−012  A10 = −3.99213e−015  A12 = 4.00069e−018 seventh surface (diffractive surface)

C2 = −3.28989e−005  C4 = −1.35044e−009  C6 = −7.63717e−013
C8 = −5.29402e−018 various data

| | |
|---|---|
| zoom ratio | 1.00 |
| focal length | 585.00 |
| F-number | 4.12 |
| angle of view | 2.12 |
| image height | 21.64 |
| overall lens length | 330.00 |
| BF | 50.00 |
| incident pupil position | 722.76 |
| exit pupil position | −108.14 |
| front principal point position | −856.26 |
| back principal point position | −535.00 | lens unit data

| unit | starting surface | focal length | lens configuration length | front principal point position | back principal point position |
|---|---|---|---|---|---|
| L1 | 1 | 163.18 | 92.85 | −11.95 | −72.97 |
| L2 | 9 | −117.87 | 9.00 | 6.03 | 0.93 |
| L3 | 12 | −278.56 | 107.63 | −11.29 | −119.91 |
| L31 | 12 | 470.61 | 29.52 | −10.99 | −33.11 |
| L32 | 19 | −41.29 | 9.48 | 4.31 | −1.97 |
| L33 | 24 | 78.44 | 58.72 | 10.76 | −40.76 |

-continued $\Delta\theta gF = \theta gF - (-1.61783 \times 10^{-3} \times vd + 0.64146)$ single lens data

| lens | starting surface | focal length |
|---|---|---|
| 1 | 1 | 228.10 |
| 2 | 3 | 356.51 |
| 3 | 5 | −94.90 |
| 4 | 6 | 1556.08 |
| 5 | 7 | 120.00 |
| 6 | 9 | 216.70 |
| 7 | 10 | −75.41 |
| 8 | 13 | −94.63 |
| 9 | 14 | 61.50 |
| 10 | 16 | 96.85 |
| 11 | 17 | −68.65 |
| 12 | 19 | 120.07 |
| 13 | 20 | −48.68 |
| 14 | 22 | −86.26 |
| 15 | 24 | 104.80 |
| 16 | 26 | 28.26 |
| 17 | 27 | −23.83 |
| 18 | 29 | −166.24 |
| 19 | 30 | −206.89 |
| 20 | 31 | 51.07 |
| G | 33 | 0.00 |

Numerical Example 2

A value of $\Delta\theta gF$, as used herein, is defined as follows:

$\Delta\theta gF = \theta gF - (-1.61783 \times 10^{-3} \times vd + 0.64146)$ aspheric data first surface K = −2.72588e−001   A4 = −2.96581e−008   A6 = −3.45376e−012
A8 = −2.32349e−016  A10 = 9.83112e−021 fourth surface

K = 6.19571e−002    A4 = 6.16081e−009    A6 = 2.06029e−012
A8 = 6.25629e−016   A10 = −4.58119e−020  A12 = 2.90121e−023 sixth surface

K = −6.57252e−001   A4 = −8.65167e−009   A6 = 7.75995e−012
A8 = 1.07239e−015   A10 = −3.81758e−019  A12 = 5.48647e−023 twenty fifth surface

K = 3.51724e+000    A4 = −2.47126e−006   A6 = −2.04889e−011
A8 = 3.02961e−012   A10 = −8.44682e−015  A12 = −6.61057e−018 twenty ninth surface

K = −1.01443e+001   A4 = 1.37866e−007    A6 = 1.79670e−009
A8 = −9.29104e−013  A10 = 1.04887e−014   A12 = −1.25453e−017 second surface (diffractive surface)

C2 = −1.70072e−005  C4 = 6.09183e−010    C6 = −4.23164e−014
C8 = 5.79225e−018   C10 = −1.26502e−022 f = 585.00 mm Fno = 4.12 2ω = 4.24

| surface number | r | d | nd | vd | effective diameter | θgF | ΔθgF | |
|---|---|---|---|---|---|---|---|---|
| 1(aspheric surface) | 128.740 | 17.72 | 1.51633 | 64.1 | 141.99 | 0.53416 | −0.00353 | |
| 2(diffraction) | 500.000 | 11.30 | 1.51633 | 64.1 | 140.86 | 0.53416 | −0.00353 | |
| 3 | −703.077 | 0.10 | | | 139.85 | | | |
| 4(aspheric surface) | 88.842 | 12.51 | 1.80518 | 25.4 | 121.02 | 0.61655 | 0.01623 | |
| 5 | 114.831 | 17.85 | | | 116.35 | | | |
| 6(aspheric surface) | 175.022 | 4.20 | 1.75520 | 27.5 | 104.42 | 0.61020 | 0.01325 | |
| 7 | 50.186 | 1.80 | 1.63555 | 22.7 | 85.50 | 0.68947 | 0.08477 | NLF |
| 8 | 52.015 | 26.86 | 1.43875 | 94.9 | 85.35 | 0.53463 | 0.04681 | |
| 9 | −6780.397 | 19.34 | | | 82.60 | | | |
| 10 | 463.835 | 5.00 | 1.80809 | 22.8 | 63.18 | | | |
| 11 | −238.497 | 4.00 | 1.74950 | 35.3 | 62.13 | | | |
| 12 | 74.292 | 51.49 | | | 55.44 | | | |
| 13(diaphragm) | ∞ | 10.00 | | | 35.53 | | | |
| 14 | 270.367 | 2.00 | 1.88300 | 40.8 | 31.02 | | | |
| 15 | 48.621 | 5.34 | 1.57501 | 41.5 | 29.92 | | | |
| 16 | −101.941 | 5.00 | | | 29.52 | | | |
| 17 | 74.246 | 5.00 | 1.64769 | 33.8 | 25.75 | | | |
| 18 | −57.511 | 2.00 | 1.84666 | 23.8 | 24.59 | | | |
| 19 | 112.964 | 4.00 | | | 23.22 | | | |
| 20 | −639.774 | 2.81 | 1.84666 | 23.8 | 23.09 | | | |
| 21 | −82.065 | 1.70 | 1.77250 | 49.6 | 23.11 | | | |
| 22 | 55.119 | 2.67 | | | 23.12 | | | |
| 23 | −257.505 | 2.50 | 1.77250 | 49.6 | 23.53 | | | |
| 24 | 94.925 | 5.00 | | | 24.36 | | | |
| 25(aspheric surface) | 53.684 | 11.03 | 1.60342 | 38.0 | 28.40 | 0.58349 | 0.00354 | |
| 26 | −50.683 | 0.10 | | | 29.45 | | | |
| 27 | −77.525 | 6.66 | 1.62588 | 35.7 | 29.34 | 0.58894 | 0.00521 | |
| 28 | −23.564 | 2.50 | 1.77250 | 49.6 | 29.55 | 0.55234 | −0.00885 | |
| 29(aspheric surface) | 133.878 | 7.91 | | | 31.24 | | | |
| 30 | 120.078 | 12.00 | 1.69895 | 30.1 | 35.95 | 0.60302 | 0.01030 | |
| 3 | −25.975 | 0.10 | 1.63555 | 22.7 | 36.55 | 0.68947 | 0.08477 | NLR |
| 32 | −31.308 | 2.50 | 1.80518 | 25.4 | 36.76 | 0.61655 | 0.01623 | |
| 33 | −85.325 | 15.00 | | | 38.29 | | | |
| 34 | ∞ | 2.00 | 1.51633 | 64.1 | 39.54 | | | |
| 35 | ∞ | | | | 39.64 | | | |

-continued $$\Delta\theta gF = \theta gF - (-1.61783 \times 10^{-3} \times \nu d + 0.64146)$$

various data

| | |
|---|---|
| zoom ratio | 1.00 |
| focal length | 585.00 |
| F-number | 4.12 |
| angle of view | 2.12 |
| image height | 21.64 |
| overall lens length | 330.00 |
| BF | 50.00 |
| incident pupil position | 754.68 |
| exit pupil position | −121.10 |
| front principal point position | −660.51 |
| back principal point position | −535.00 | lens unit data

| unit | starting surface | focal length | lens configuration length | front principal point position | back principal point position |
|---|---|---|---|---|---|
| L1 | 1 | 162.06 | 92.33 | −12.24 | −72.30 |
| L2 | 10 | −124.88 | 9.00 | 6.28 | 1.17 |
| L3 | 13 | −305.08 | 107.84 | −49.79 | −180.59 |
| L31 | 13 | 1168.11 | 29.34 | −36.68 | −57.52 |
| L32 | 20 | −38.07 | 9.69 | 3.95 | −2.51 |
| L33 | 25 | 71.46 | 59.81 | 14.73 | −35.30 |

-continued $$\Delta\theta gF = \theta gF - (-1.61783 \times 10^{-3} \times \nu d + 0.64146)$$

single lens data

| lens | starting surface | focal length |
|---|---|---|
| 1 | 1 | 330.43 |
| 2 | 2 | 567.73 |
| 3 | 4 | 401.38 |
| 4 | 6 | −94.54 |
| 5 | 7 | 1624.48 |
| 6 | 8 | 117.79 |
| 7 | 10 | 195.54 |
| 8 | 11 | −75.17 |
| 9 | 14 | −67.42 |
| 10 | 15 | 58.00 |
| 11 | 17 | 50.79 |
| 12 | 18 | −44.77 |
| 13 | 20 | 110.93 |
| 14 | 21 | −42.45 |
| 15 | 23 | −89.51 |
| 16 | 25 | 44.99 |
| 17 | 27 | 51.64 |
| 18 | 28 | −25.76 |
| 19 | 30 | 31.62 |
| 20 | 31 | −241.66 |
| 21 | 32 | −62.72 |
| G | 34 | 0.00 |

Numerical Example 3 f = 585.01 mm Fno = 4.12 2ω = 4.24

| surface number | r | d | nd | νd | effective diameter | θgF | ΔθgF | |
|---|---|---|---|---|---|---|---|---|
| 1(aspheric surface) | 117.574 | 19.70 | 1.51633 | 64.1 | 141.99 | 0.53416 | −0.00353 | |
| 2 | 319.657 | 0.34 | 1.78927 | 17.6 | 139.77 | 0.79406 | 0.18112 | NLF |
| 3 | 327.00 | 14.51 | 1.51633 | 64.1 | 139.70 | 0.53416 | −0.00353 | |
| 4 | −1151.028 | 0.10 | | | 137.72 | | | |
| 5(aspheric surface) | 102.251 | 11.28 | 1.75520 | 27.5 | 121.78 | 0.61020 | 0.01325 | |
| 6 | 129.217 | 23.10 | | | 116.72 | | | |
| 7(aspheric surface) | 162.202 | 4.20 | 1.80000 | 29.8 | 99.01 | 0.60187 | 0.00870 | |
| 8(diffraction) | 55.730 | 28.21 | 1.43875 | 94.9 | 85.03 | 0.53463 | 0.04681 | |
| 9 | −862.298 | 19.32 | | | 80.68 | | | |
| 10 | 390.086 | 5.00 | 1.80809 | 22.8 | 60.83 | | | |
| 11 | −303.624 | 4.00 | 1.74950 | 35.3 | 59.52 | | | |
| 12 | 67.631 | 51.47 | | | 53.15 | | | |
| 13(diaphragm) | ∞ | 10.00 | | | 35.02 | | | |
| 14 | 395.613 | 4.65 | 1.54072 | 47.2 | 30.97 | | | |
| 15 | −50.765 | 2.00 | 1.88300 | 40.8 | 30.40 | | | |
| 16 | −82.186 | 5.00 | | | 30.08 | | | |
| 17 | 74.585 | 5.00 | 1.48749 | 70.2 | 25.79 | | | |
| 18 | −251.279 | 2.00 | 1.88300 | 40.8 | 24.81 | | | |
| 19 | 94.273 | 4.00 | | | 24.37 | | | |
| 20 | 2574.482 | 2.81 | 1.84666 | 23.8 | 24.27 | | | |
| 21 | −96.759 | 1.70 | 1.77250 | 49.6 | 24.22 | | | |
| 22 | 49.677 | 2.67 | | | 24.09 | | | |
| 23 | −388.495 | 2.50 | 1.77250 | 49.6 | 24.43 | | | |
| 24 | 78.728 | 5.00 | | | 25.23 | | | |
| 25(aspheric surface) | 57.184 | 5.50 | 1.48749 | 70.2 | 29.21 | 0.53026 | 0.00244 | |
| 26 | −66.623 | 0.10 | | | 29.71 | | | |
| 27 | 619.872 | 8.27 | 1.65412 | 39.7 | 30.01 | 0.57403 | −0.00322 | |
| 28 | −23.667 | 2.50 | 1.80440 | 39.6 | 30.21 | 0.57283 | −0.00458 | |
| 29(aspheric surface) | 194.974 | 5.54 | | | 31.89 | | | |
| 30 | 321.884 | 9.95 | 1.72825 | 28.5 | 34.32 | 0.60766 | 0.01224 | |
| 31 | −25.614 | 0.10 | 1.78927 | 17.6 | 34.86 | 0.79406 | 0.18112 | NLR |
| 32 | −30.109 | 2.50 | 1.72916 | 54.7 | 35.18 | 0.54423 | −0.00880 | |
| 33 | −97.611 | 15.00 | | | 36.58 | | | |
| 34 | ∞ | 2.00 | 1.51633 | 64.1 | 38.22 | | | |
| 35 | ∞ | | | | 38.35 | | | |

A value of $\Delta\theta gF$, as used herein, is defined as follows:

$$\Delta\theta gF = \theta gF - (-1.61783 \times 10^{-3} \times \nu d + 0.64146)$$

aspheric data first surface

K = −2.41497e−001　　A4 = −2.62052e−008　　A6 = −3.00481e−012
A8 = −3.22164e−016　　A10 = 1.57989e−021 fifth surface

K = 4.65762e−002　　A4 = −2.61332e−009　　A6 = 3.19356e−013
A8 = 5.53183e−016　　A10 = −3.65126e−020　　A12 = 1.26283e−023 seventh surface

K = −7.16100e−001　　A4 = −8.00366e−009　　A6 = 5.78518e−012
A8 = 1.60502e−015　　A10 = −3.00367e−019　　A12 = 2.96230e−023 twenty fifth surface

K = 5.93556e+000　　A4 = −6.70976e−006　　A6 = 2.43261e−009
A8 = −1.74055e−011　　A10 = 6.71462e−014　　A12 = −1.75986e−016 twenty ninth surface

K = −9.91413e+001　　A4 = −1.57799e−006　　A6 = 8.12592e−010
A8 = −3.70759e−012　　A10 = 2.26035e−014　　A12 = −3.53132e−017 eighth surface (diffractive surface)

C2 = −3.78006e−005　　C4 = −2.47639e−009　　C6 = −1.79197e−012
C8 = 3.61334e−016 various data

| | |
|---|---|
| zoom ratio | 1.00 |
| focal length | 585.01 |
| F-number | 4.12 |
| angle of view | 2.12 |
| image height | 21.64 |
| overall lens length | 330.00 |
| BF | 50.00 |
| incident pupil position | 809.38 |
| exit pupil position | −97.06 |
| front principal point position | −932.84 |
| back principal point position | −535.01 | lens unit data

| unit | starting surface | focal length | lens configuration length | front principal point position | back principal point position |
|---|---|---|---|---|---|
| L1 | 1 | 165.01 | 101.42 | −5.59 | −76.59 |
| L2 | 10 | −114.97 | 9.00 | 6.37 | 1.25 |
| L3 | 13 | −257.25 | 98.79 | −9.67 | −107.10 |
| L31 | 13 | 603.62 | 28.65 | −25.56 | −45.91 |
| L32 | 20 | −37.18 | 9.69 | 4.24 | −2.24 |
| L33 | 25 | 68.08 | 51.46 | 9.37 | −32.64 | single lens data

| lens | starting surface | focal length |
|---|---|---|
| 1 | 1 | 348.62 |
| 2 | 2 | 17659.59 |
| 3 | 3 | 494.86 |
| 4 | 5 | 549.85 |
| 5 | 7 | −108.02 |
| 6 | 8 | 120.44 |
| 7 | 10 | 211.96 |
| 8 | 11 | −73.46 |
| 9 | 14 | 83.51 |
| 10 | 15 | −155.00 |
| 11 | 17 | 118.58 |
| 12 | 18 | −77.43 |
| 13 | 20 | 110.20 |
| 14 | 21 | −42.28 |
| 15 | 23 | −84.54 |
| 16 | 25 | 64.06 |
| 17 | 27 | 35.03 |
| 18 | 28 | −26.10 |
| 19 | 30 | 32.98 |
| 20 | 31 | −219.53 |
| 21 | 32 | −60.66 |
| G | 34 | 0.00 |

Numerical Example 4

| f = 779.00 mm Fno = 5.80 2ω = 3.18 | | | | | | | | |
|---|---|---|---|---|---|---|---|---|
| surface number | r | d | nd | νd | effective diameter | θgF | ΔθgF | |
| 1(aspheric surface) | 150.484 | 17.46 | 1.48749 | 70.2 | 134.31 | 0.53026 | 0.00244 | |
| 2 | 1417.702 | 0.10 | | | 133.22 | | | |
| 3(aspheric surface) | 187.298 | 9.09 | 1.70154 | 41.2 | 129.15 | 0.57672 | 0.00198 | |
| 4 | 446.327 | 24.88 | | | 128.03 | | | |
| 5(aspheric surface) | 457.099 | 5.50 | 1.72047 | 34.7 | 110.71 | 0.58361 | −0.00167 | |
| 6(diffraction) | 90.746 | 0.38 | 1.70877 | 21.6 | 101.61 | 0.81721 | 0.21074 | NLF |
| 7 | 92.023 | 20.28 | 1.43875 | 94.9 | 101.55 | 0.53463 | 0.04681 | |
| 8 | −854.409 | 106.11 | | | 100.25 | | | |
| 9 | −4722.398 | 4.03 | 1.75520 | 27.5 | 36.00 | | | |
| 10 | −76.640 | 2.00 | 1.72342 | 38.0 | 35.35 | | | |
| 11 | 81.266 | 32.59 | | | 33.36 | | | |
| 12(diaphragm) | ∞ | 2.50 | | | 24.47 | | | |
| 13 | 135.033 | 1.88 | 1.88300 | 40.8 | 23.60 | | | |
| 14 | 33.932 | 4.28 | 1.61772 | 49.8 | 22.81 | | | |
| 15 | −95.373 | 2.00 | | | 22.55 | | | |
| 16 | 116.206 | 2.80 | 1.80809 | 22.8 | 21.24 | | | |
| 17 | −96.722 | 1.94 | 1.83481 | 42.7 | 20.70 | | | |
| 18 | 47.554 | 3.00 | | | 19.63 | | | |
| 19 | −140.177 | 1.90 | 1.74100 | 52.6 | 19.30 | | | |
| 20 | 78.442 | 1.76 | | | 19.13 | | | |
| 21(aspheric surface) | 32.856 | 3.58 | 1.48749 | 70.2 | 19.35 | 0.53026 | 0.00244 | |
| 22 | 75.156 | 12.24 | | | 18.96 | | | |
| 23 | 75.603 | 9.52 | 1.64769 | 33.8 | 22.47 | 0.59447 | 0.00769 | |
| 24 | −19.196 | 2.00 | 1.88300 | 40.8 | 22.71 | 0.56694 | −0.00857 | |
| 25 | −79.883 | 5.00 | | | 23.77 | | | |

-continued

| | | f = 779.00 mm Fno = 5.80 2ω = 3.18 | | | | | |
|---|---|---|---|---|---|---|---|
| surface number | r | d | nd | νd | effective diameter | θgF | ΔθgF |
| 26 | −35.328 | 2.00 | 1.80809 | 22.8 | 24.32 | 0.63070 | 0.02607 |
| 27 | −187.997 | 5.00 | | | 25.82 | | |
| 28 | 930.917 | 2.80 | 1.48749 | 70.2 | 29.34 | 0.53026 | 0.00244 |
| 29 | −2064.439 | 0.10 | 1.70877 | 21.6 | 30.40 | 0.81721 | 0.21074 NLR |
| 30 | 200.441 | 8.84 | 1.69895 | 30.1 | 30.66 | 0.60302 | 0.01030 |
| 31 | −48.474 | 6.42 | | | 32.58 | | |
| 32 | ∞ | 2.20 | 1.51633 | 64.1 | 33.60 | | |
| 33 | ∞ | | | | 33.76 | | |

A value of $\Delta\theta gF$, as used herein, is defined as follows:

$$\Delta\theta gF = \theta gF - (-1.61783 \times 10^{-3} \times \nu d + 0.64146)$$

aspheric data first surface

K = −2.16884e−001   A4 = −8.30550e−009   A6 = −5.37949e−013
A8 = −3.31934e−017  A10 = −9.09014e−021  A12 = −1.87542e−024 third surface

K = 1.14426e−001    A4 = 3.69915e−009    A6 = 2.30180e−013
A8 = 5.59767e−017   A10 = 9.88507e−021   A12 = 3.31149e−024 fifth surface

K = −1.79816e+001   A4 = −3.47271e−010   A6 = −2.79085e−013
A8 = 1.92835e−016   A10 = −1.10504e−019  A12 = 9.93140e−024 twenty first surface

K = 1.09186e+000    A4 = 7.26284e−007    A6 = 2.35034e−009
A8 = 4.31822e−012   A10 = 2.52710e−014   A12 = −1.67867e−017 sixth surface (diffractive surface)

C2 = −1.90119e−005  C4 = −9.07462e−011   C6 = −4.25190e−013
C8 = 4.27203e−016   C10 = −1.65366e−019  C12 = 2.05095e−023 various data

| | |
|---|---|
| zoom ratio | 1.00 |
| focal length | 779.00 |
| F-number | 5.80 |
| angle of view | 1.59 |
| image height | 21.64 |
| overall lens length | 390.00 |
| BF | 85.83 |
| incident pupil position | 1421.29 |
| exit pupil position | −100.48 |
| front principal point position | −1056.95 |
| back principal point position | −693.17 |

-continued $$\Delta\theta gF = \theta gF - (-1.61783 \times 10^{-3} \times \nu d + 0.64146)$$

lens unit data

| unit | starting surface | focal length | lens configuration length | front principal point position | back principal point position |
|---|---|---|---|---|---|
| L1 | 1 | 230.95 | 77.69 | −5.88 | −63.80 |
| L2 | 9 | −115.64 | 6.03 | 3.45 | −0.01 |
| L3 | 12 | −527.12 | 81.74 | −133.57 | −279.38 |
| L31 | 12 | 191.28 | 8.66 | 5.55 | −0.63 |
| L32 | 16 | −38.97 | 9.64 | 5.53 | −1.22 |
| L33 | 21 | 83.74 | 59.69 | 23.05 | −36.56 | single lens data

| lens | starting surface | focal length |
|---|---|---|
| 1 | 1 | 343.80 |
| 2 | 3 | 453.47 |
| 3 | 5 | −158.15 |
| 4 | 6 | 8216.92 |
| 5 | 7 | 190.59 |
| 6 | 9 | 103.12 |
| 7 | 10 | −54.23 |
| 8 | 13 | −51.78 |
| 9 | 14 | 41.03 |
| 10 | 16 | 65.71 |
| 11 | 17 | −37.96 |
| 12 | 19 | −67.63 |
| 13 | 21 | 116.51 |
| 14 | 23 | 24.61 |
| 15 | 24 | −29.07 |
| 16 | 26 | −54.15 |
| 17 | 28 | 1316.53 |
| 18 | 29 | −257.77 |
| 19 | 30 | 56.67 |
| G | 32 | 0.00 |

Numerical Example 5

| | | f = 779.04 mm Fno = 5.80 2ω = 3.18 | | | | | |
|---|---|---|---|---|---|---|---|
| surface number | r | d | nd | νd | effective diameter | θgF | ΔθgF |
| 1(aspheric surface) | 131.979 | 13.45 | 1.48749 | 70.2 | 134.32 | 0.53026 | 0.00244 |
| 2 | 328.720 | 1.54 | 1.69591 | 17.7 | 133.43 | 0.68555 | 0.07268 NLF |
| 3 | 415.066 | 4.72 | 1.48749 | 70.2 | 133.40 | 0.53026 | 0.00244 |
| 4 | 670.392 | 0.10 | | | 132.47 | | |
| 5(aspheric surface) | 204.497 | 9.76 | 1.66672 | 48.3 | 129.29 | 0.56014 | −0.00316 |
| 6 | 587.159 | 22.52 | | | 127.84 | | |
| 7(aspheric surface) | 405.597 | 5.50 | 1.73800 | 32.3 | 110.70 | 0.59029 | 0.00104 |
| 8(diffraction) | 88.918 | 20.14 | 1.43875 | 94.9 | 101.28 | 0.53463 | 0.04681 |
| 9 | −567.163 | 105.25 | | | 100.50 | | |
| 10 | −435.806 | 3.99 | 1.75520 | 27.5 | 31.90 | | |

-continued f = 779.04 mm Fno = 5.80 2ω = 3.18

| surface number | r | d | nd | νd | effective diameter | θgF | ΔθgF | |
|---|---|---|---|---|---|---|---|---|
| 11 | −47.046 | 2.00 | 1.72342 | 38.0 | 31.40 | | | |
| 12 | 58.411 | 32.06 | | | 29.18 | | | |
| 13(diaphragm) | ∞ | 2.50 | | | 22.71 | | | |
| 14 | 91.338 | 1.88 | 1.88300 | 40.8 | 22.03 | | | |
| 15 | 34.565 | 4.01 | 1.51742 | 52.4 | 21.37 | | | |
| 16 | −70.386 | 2.00 | | | 21.17 | | | |
| 17 | 150.917 | 2.39 | 1.80809 | 22.8 | 24.68 | | | |
| 18 | −111.656 | 1.94 | 1.83481 | 42.7 | 24.35 | | | |
| 19 | 47.532 | 2.12 | | | 23.27 | | | |
| 20 | −144.481 | 1.90 | 1.74100 | 52.6 | 23.26 | | | |
| 21 | 97.096 | 1.76 | | | 23.35 | | | |
| 22(aspheric surface) | 32.082 | 3.04 | 1.48749 | 70.2 | 19.99 | 0.53026 | 0.00244 | |
| 23 | 76.925 | 10.93 | | | 20.20 | | | |
| 24 | 83.691 | 9.81 | 1.63980 | 34.5 | 23.34 | 0.59213 | 0.00644 | |
| 25 | −17.727 | 2.00 | 1.88300 | 40.8 | 23.61 | 0.56694 | −0.00857 | |
| 26 | −90.189 | 5.00 | | | 25.13 | | | |
| 27 | −32.914 | 2.00 | 1.80809 | 22.8 | 25.96 | 0.63070 | 0.02607 | |
| 28 | −60.545 | 5.00 | | | 27.56 | | | |
| 29 | −273.560 | 2.00 | 1.48749 | 70.2 | 31.01 | 0.53026 | 0.00244 | |
| 30 | −429.316 | 0.10 | 1.69591 | 17.7 | 31.89 | 0.68555 | 0.07268 | NLR |
| 31 | 115.930 | 9.02 | 1.74000 | 28.3 | 32.45 | 0.60742 | 0.01172 | |
| 32 | −50.777 | 6.42 | | | 34.17 | | | |
| 33 | ∞ | 2.20 | 1.51633 | 64.1 | 35.00 | | | |
| 34 | ∞ | | | | 35.13 | | | |

A value of ΔθgF, as used herein, is defined as follows:

$$\Delta\theta gF = \theta gF - (-1.61783 \times 10^{-3} \times \nu d + 0.64146)$$

aspheric data first surface

K = −1.83034e−001  A4 = −1.08632e−008  A6 = −9.98581e−013
A8 = −7.10141e−017  A10 = −3.01780e−021  A12 = −5.37565e−024
A14 = 5.56342e−029 fifth surface

K = −1.90062e−001  A4 = 1.60544e−010  A6 = 5.45450e−013
A8 = −2.16694e−018  A10 = 1.86708e−020  A12 = 4.47511e−024
A14 = −2.83754e−029 seventh surface

K = −1.68339e+001  A4 = 7.91371e−009  A6 = −9.00747e−013
A8 = 1.64387e−016  A10 = −3.16993e−020  A12 = 3.44828e−024
A14 = −8.48929e−028 twenty second surface

K = 9.80810e−001  A4 = 2.46751e−006  A6 = 1.06161e−008
A8 = −7.35318e−011  A10 = 6.76391e−013  A12 = −1.63553e−015 eighth surface (diffractive surface)

C2 = −1.64441e−005  C4 = −1.44139e−010  C6 = 1.20065e−014
C8 = 8.74221e−017  C10 = −1.96810e−020 various data

| | |
|---|---|
| zoom ratio | 1.00 |
| focal length | 779.00 |
| F-number | 5.80 |
| angle of view | 1.59 |
| image height | 21.64 |
| overall lens length | 389.95 |
| BF | 90.92 |
| incident pupil position | 1658.05 |
| exit pupil position | −102.29 |
| front principal point position | −704.08 |
| back principal point position | −688.12 |

-continued $$\Delta\theta gF = \theta gF - (-1.61783 \times 10^{-3} \times \nu d + 0.64146)$$

lens unit data

| unit | starting surface | focal length | lens configuration length | front principal point position | back principal point position |
|---|---|---|---|---|---|
| L1 | 1 | 216.78 | 77.72 | −2.92 | −60.90 |
| L2 | 10 | −74.05 | 5.99 | 3.04 | −0.38 |
| L3 | 13 | 922.69 | 78.00 | 305.00 | 353.31 |
| L31 | 13 | 154.12 | 8.38 | 5.03 | −1.16 |
| L32 | 17 | −39.52 | 8.35 | 4.33 | −1.28 |
| L33 | 22 | 76.00 | 57.51 | 23.54 | −33.22 | single lens data

| lens | starting surface | focal length |
|---|---|---|
| 1 | 1 | 442.44 |
| 2 | 2 | 2254.16 |
| 3 | 3 | 2222.10 |
| 4 | 5 | 465.88 |
| 5 | 7 | −155.46 |
| 6 | 8 | 176.85 |
| 7 | 10 | 69.53 |
| 8 | 11 | −35.74 |
| 9 | 14 | −63.97 |
| 10 | 15 | 45.39 |
| 11 | 17 | 79.74 |
| 12 | 18 | −39.72 |
| 13 | 20 | −78.11 |
| 14 | 22 | 110.44 |
| 15 | 24 | 23.76 |
| 16 | 25 | −25.32 |
| 17 | 27 | −92.23 |
| 18 | 29 | −1553.28 |
| 19 | 30 | −131.16 |
| 20 | 31 | 48.84 |
| G | 33 | 0.00 |

Numerical Example 6

| | | | | | effective | | | |
|---|---|---|---|---|---|---|---|---|
| surface number | r | d | nd | νd | diameter | θgF | ΔθgF | | f = 779.00 mm Fno = 5.80 2ω = 3.18

| surface number | r | d | nd | νd | effective diameter | θgF | ΔθgF | |
|---|---|---|---|---|---|---|---|---|
| 1 | 139.205 | 15.19 | 1.48749 | 70.2 | 134.31 | 0.53026 | 0.00244 | |
| 2(diffraction) | 473.490 | 4.99 | 1.48749 | 70.2 | 133.39 | 0.53026 | 0.00244 | |
| 3 | 972.819 | 0.10 | | | 132.50 | | | |
| 4(aspheric surface) | 200.987 | 6.28 | 1.67270 | 32.1 | 128.79 | 0.59905 | 0.00953 | |
| 5 | 344.389 | 22.63 | | | 127.72 | | | |
| 6 | 179.959 | 5.50 | 1.73800 | 32.3 | 111.64 | 0.59029 | 0.00104 | |
| 7 | 76.314 | 1.80 | 1.55324 | 39.8 | 101.46 | 0.66403 | 0.08696 | NLF |
| 8 | 81.509 | 20.20 | 1.43875 | 94.9 | 101.37 | 0.53463 | 0.04681 | |
| 9 | 1235.977 | 103.73 | | | 99.78 | | | |
| 10 | −2222.576 | 4.13 | 1.75520 | 27.5 | 36.00 | | | |
| 11 | −72.042 | 2.00 | 1.72342 | 38.0 | 35.33 | | | |
| 12 | 79.505 | 31.65 | | | 33.23 | | | |
| 13(diaphragm) | ∞ | 2.50 | | | 24.31 | | | |
| 14 | 88.185 | 1.88 | 1.88300 | 40.8 | 23.33 | | | |
| 15 | 29.408 | 4.81 | 1.51742 | 52.4 | 22.39 | | | |
| 16 | −77.673 | 2.00 | | | 22.11 | | | |
| 17 | 168.131 | 2.80 | 1.80809 | 22.8 | 20.86 | | | |
| 18 | −73.571 | 1.94 | 1.83481 | 42.7 | 20.37 | | | |
| 19 | 46.593 | 2.54 | | | 19.39 | | | |
| 20 | −190.809 | 1.90 | 1.74100 | 52.6 | 19.22 | | | |
| 21 | 90.853 | 1.76 | | | 19.13 | | | |
| 22(aspheric surface) | 32.678 | 3.58 | 1.51823 | 58.9 | 19.40 | 0.54608 | −0.00001 | |
| 23 | 55.871 | 7.68 | | | 19.30 | | | |
| 24 | 56.402 | 10.11 | 1.64769 | 33.8 | 21.71 | 0.59447 | 0.00769 | |
| 25 | −17.102 | 2.00 | 1.88300 | 40.8 | 21.84 | 0.56694 | −0.00857 | |
| 26 | −53.983 | 5.00 | | | 22.89 | | | |
| 27(aspheric surface) | −30.455 | 2.00 | 1.80809 | 22.8 | 23.03 | 0.63070 | 0.02607 | |
| 28 | 315.476 | 5.00 | | | 24.79 | | | |
| 29 | 1127.290 | 6.50 | 1.63980 | 34.5 | 28.76 | 0.59213 | 0.00644 | |
| 30 | −46.633 | 0.10 | 1.55324 | 39.8 | 30.53 | 0.66403 | 0.08696 | NLR |
| 31 | −94.836 | 6.44 | 1.63980 | 34.5 | 31.16 | 0.59213 | 0.00644 | |
| 32(aspheric surface) | −37.216 | 6.42 | | | 32.86 | | | |
| 33 | ∞ | 2.20 | 1.51633 | 64.1 | 33.89 | | | |
| 34 | ∞ | | | | 34.03 | | | |

A value of ΔθgF, as used herein, is defined as follows:

$$\Delta\theta gF = \theta gF - (-1.61783 \times 10^{-3} \times \nu d + 0.64146)$$

aspheric data fourth surface

K = −5.64293e−001   A4 = −9.91818e−009   A6 = −5.58202e−013
A8 = −1.63077e−017   A10 = 3.94688e−021   A12 = −5.24722e−025 twenty second surface

K = 1.22852e+000   A4 = 3.42832e−006   A6 = 1.29147e−008
A8 = −3.96000e−012   A10 = 1.98086e−013   A12 = −6.44845e−017 twenty seventh surface

K = 1.32604e−001   A4 = −9.68621e−007   A6 = −5.47105e−010
A8 = −6.49025e−012   A10 = −2.52564e−015 thirty second surface

K = 3.81075e−001   A4 = 2.05748e−007   A6 = 7.66606e−010
A8 = −4.76054e−013   A10 = 1.17150e−015 second surface (diffractive surface)

C2 = −1.32140e−005   C4 = 3.58697e−010   C6 = −6.24068e−014
C8 = 1.49334e−017   C10 = −1.28240e−021 various data

| | |
|---|---|
| zoom ratio | 1.00 |
| focal length | 779.00 |
| F-number | 5.80 |
| angle of view | 1.59 |

-continued $$\Delta\theta gF = \theta gF - (-1.61783 \times 10^{-3} \times \nu d + 0.64146)$$

| | |
|---|---|
| image height | 21.64 |
| overall lens length | 390.00 |
| BF | 92.65 |
| incident pupil position | 1390.95 |
| exit pupil position | −102.40 |
| front principal point position | −941.23 |
| back principal point position | −686.35 | lens unit data

| unit | starting surface | focal length | lens configuration length | front principal point position | back principal point position |
|---|---|---|---|---|---|
| L1 | 1 | 222.42 | 76.69 | −3.46 | −59.99 |
| L2 | 10 | −111.07 | 6.13 | 3.43 | −0.08 |
| L3 | 13 | −567.69 | 79.16 | −166.70 | −338.39 |
| L31 | 13 | 229.92 | 9.18 | 6.09 | −0.63 |
| L32 | 17 | −38.90 | 9.18 | 4.67 | −1.57 |
| L33 | 22 | 81.99 | 57.04 | 24.49 | −32.02 | single lens data

| lens | starting surface | focal length |
|---|---|---|
| 1 | 1 | 398.53 |
| 2 | 2 | 1886.13 |
| 3 | 4 | 705.11 |
| 4 | 6 | −183.68 |
| 5 | 7 | 1926.51 |
| 6 | 8 | 197.83 |

-continued

| $\Delta\theta gF = \theta gF - (-1.61783 \times 10^{-3} \times vd + 0.64146)$ | | |
|---|---|---|
| 7 | 10 | 98.51 |
| 8 | 11 | −51.96 |
| 9 | 14 | −50.73 |
| 10 | 15 | 41.87 |
| 11 | 17 | 63.66 |
| 12 | 18 | −33.92 |
| 13 | 20 | −82.82 |
| 14 | 22 | 144.29 |
| 15 | 24 | 21.42 |
| 16 | 25 | −29.09 |
| 17 | 27 | −34.28 |
| 18 | 29 | 70.14 |
| 19 | 30 | −165.96 |
| 20 | 31 | 91.74 |
| G | 33 | 0.00 |

Numerical Example 7

| f = 585.00 mm Fno = 4.12 2ω = 4.24 | | | | | | | |
|---|---|---|---|---|---|---|---|
| surface number | r | d | nd | vd | effective diameter | θgF | ΔθgF |
| 1(aspheric surface) | 125.329 | 10.31 | 1.51633 | 64.1 | 141.99 | 0.53416 | −0.00353 |
| 2 | 213.016 | 1.80 | 1.63555 | 22.7 | 141.20 | 0.68947 | 0.08477 NLF |
| 3 | 242.710 | 14.08 | 1.51633 | 64.1 | 141.11 | 0.53416 | −0.00353 |
| 4 | −1911.918 | 0.10 | | | 140.26 | | |
| 5(aspheric surface) | 105.549 | 12.68 | 1.80518 | 25.4 | 126.26 | 0.61655 | 0.01623 |
| 6 | 158.228 | 20.89 | | | 122.60 | | |
| 7(aspheric surface) | 221.218 | 4.20 | 1.76182 | 26.5 | 105.09 | 0.61330 | 0.01473 |
| 8(diffraction) | 55.160 | 29.19 | 1.43875 | 94.9 | 88.11 | 0.53463 | 0.04681 |
| 9 | −484.404 | 19.44 | | | 85.11 | | |
| 10 | 352.083 | 5.00 | 1.80809 | 22.8 | 63.40 | | |
| 11 | −448.754 | 4.00 | 1.74950 | 35.3 | 61.94 | | |
| 12 | 68.640 | 52.04 | | | 55.30 | | |
| 13(diaphragm) | ∞ | 10.00 | | | 35.96 | | |
| 14 | 199.540 | 2.00 | 1.74950 | 35.3 | 31.52 | | |
| 15 | 89.154 | 4.13 | 1.51742 | 52.4 | 30.69 | | |
| 16 | −127.966 | 5.00 | | | 30.12 | | |
| 17 | 79.382 | 5.00 | 1.56732 | 42.8 | 25.93 | | |
| 18 | −78.937 | 2.00 | 1.88300 | 40.8 | 24.43 | | |
| 19 | 106.020 | 4.00 | | | 23.16 | | |
| 20 | −677.279 | 2.81 | 1.84666 | 23.8 | 22.99 | | |
| 21 | −80.136 | 1.70 | 1.77250 | 49.6 | 23.01 | | |
| 22 | 54.318 | 2.59 | | | 23.01 | | |
| 23 | −312.276 | 2.50 | 1.77250 | 49.6 | 23.41 | | |
| 24 | 89.405 | 5.00 | | | 24.21 | | |
| 25(aspheric surface) | 49.266 | 7.53 | 1.51742 | 52.4 | 28.46 | 0.55623 | −0.00042 |
| 26 | 327.971 | 0.10 | | | 29.10 | | |
| 27 | 65.739 | 12.00 | 1.65412 | 39.7 | 29.42 | 0.57403 | −0.00322 |
| 28 | −18.635 | 2.50 | 1.80400 | 46.6 | 29.25 | 0.55736 | −0.00874 |
| 29(aspheric surface) | 64.125 | 6.34 | | | 31.06 | | |
| 30 | 101.218 | 12.00 | 1.69895 | 30.1 | 35.45 | 0.60302 | 0.01030 |
| 31 | −25.758 | 2.50 | 1.80809 | 22.8 | 36.18 | 0.63070 | 0.02607 |
| 32 | −59.627 | 7.45 | | | 38.46 | | |
| 33 | ∞ | 2.00 | 1.51633 | 64.1 | 39.21 | | |
| 34 | ∞ | | | | 39.30 | | |

A value of ΔθgF, as used herein, is defined as follows:

| $\Delta\theta gF = \theta gF - (-1.61783 \times 10^{-3} \times vd + 0.64146)$ | | |
|---|---|---|
| aspheric data | | |
| first surface | | |
| K = −2.26889e−001 | A4 = −2.23279e−008 | A6 = −3.67273e−012 |
| A8 = −6.22189e−016 | A10 = 1.96958e−020 | |

-continued

| $\Delta\theta gF = \theta gF - (-1.61783 \times 10^{-3} \times vd + 0.64146)$ | | |
|---|---|---|
| fifth surface | | |
| K = 4.68384e−002 | A4 = −1.92346e−009 | A6 = 1.44792e−012 |
| A8 = 8.14389e−016 | A10 = −1.32355e−020 | A12 = 2.53007e−023 |
| seventh surface | | |
| K = −3.61869e−001 | A4 = −1.64758e−009 | A6 = 6.58165e−012 |
| A8 = 7.84153e−016 | A10 = −8.06872e−019 | A12 = 1.10181e−022 |
| twenty fifth surface | | |
| K = 5.71323e+000 | A4 = −3.26073e−006 | A6 = 8.23054e−010 |
| A8 = −5.26344e−012 | A10 = 7.83965e−015 | A12 = −2.96476e−017 |
| twenty ninth surface | | |
| K = −6.15197e+000 | A4 = 1.12736e−006 | A6 = −3.77448e−010 |
| A8 = 2.61322e−012 | A10 = −6.72831e−015 | A12 = 1.20238e−017 |

-continued

| $\Delta\theta gF = \theta gF - (-1.61783 \times 10^{-3} \times vd + 0.64146)$ | | |
|---|---|---|
| eight surface (diffractive surface) | | |
| C2 = −4.03619e−005 | C4 = 3.81145e−009 | C6 = 1.04977e−013 |
| C8 = −3.09944e−016 | | |
| various data | | |
| zoom ratio | | 1.00 |
| focal length | | 585.00 |
| F-number | | 4.12 |

-continued $$\Delta\theta gF = \theta gF - (-1.61783 \times 10^{-3} \times vd + 0.64146)$$

| | |
|---|---|
| angle of view | 2.12 |
| image height | 21.64 |
| overall lens length | 330.00 |
| BF | 57.12 |
| incident pupil position | 755.51 |
| exit pupil position | −114.38 |
| front principal point position | −654.98 |
| back principal point position | −527.88 | lens unit data

| unit | starting surface | focal length | lens configuration length | front principal point position | back principal point position |
|---|---|---|---|---|---|
| L1 | 1 | 160.77 | 93.25 | −5.55 | −71.18 |
| L2 | 10 | −119.55 | 9.00 | 6.55 | 1.42 |
| L3 | 13 | −328.57 | 99.15 | −50.33 | −173.81 |
| L31 | 13 | 1391.73 | 28.13 | −98.42 | −112.45 |
| L32 | 20 | −37.96 | 9.61 | 3.95 | −2.44 |
| L33 | 25 | 71.09 | 52.41 | 15.26 | −28.15 |

-continued $$\Delta\theta gF = \theta gF - (-1.61783 \times 10^{-3} \times vd + 0.64146)$$

single lens data

| lens | starting surface | focal length |
|---|---|---|
| 1 | 1 | 566.96 |
| 2 | 2 | 2676.58 |
| 3 | 3 | 418.05 |
| 4 | 5 | 355.57 |
| 5 | 7 | −97.52 |
| 6 | 8 | 114.76 |
| 7 | 10 | 244.83 |
| 8 | 11 | −79.17 |
| 9 | 14 | −216.70 |
| 10 | 15 | 102.22 |
| 11 | 17 | 70.57 |
| 12 | 18 | −50.98 |
| 13 | 20 | 107.12 |
| 14 | 21 | −41.68 |
| 15 | 23 | −89.73 |
| 16 | 25 | 111.02 |
| 17 | 27 | 23.52 |
| 18 | 28 | −17.72 |
| 19 | 30 | 30.57 |
| 20 | 31 | −58.03 |
| G | 33 | 0.00 |

Numerical Example 8

$f = 585.02$ mm Fno = 4.12 $2\omega = 4.24$

| surface number | r | d | nd | vd | effective diameter | θgF | ΔθgF | |
|---|---|---|---|---|---|---|---|---|
| 1(aspheric surface) | 129.326 | 24.94 | 1.51742 | 52.4 | 141.99 | 0.55623 | −0.00042 | |
| 2 | −1339.898 | 0.10 | | | 140.66 | | | |
| 3(aspheric surface) | 112.537 | 9.61 | 1.80518 | 25.4 | 127.92 | 0.61655 | 0.01623 | |
| 4 | 145.043 | 11.77 | | | 124.64 | | | |
| 5(aspheric surface) | 170.834 | 4.20 | 1.75520 | 27.5 | 117.17 | 0.61020 | 0.01325 | |
| 6 | 62.051 | 1.80 | 1.63555 | 22.7 | 100.63 | 0.68947 | 0.08477 | NLF |
| 7(diffraction) | 64.585 | 29.34 | 1.43875 | 94.9 | 100.55 | 0.53463 | 0.04681 | |
| 8 | −703.982 | 23.39 | | | 98.54 | | | |
| 9(diaphragm) | ∞ | 5.00 | | | 75.07 | | | |
| 10 | 119.273 | 5.00 | 1.80809 | 22.8 | 66.05 | | | |
| 11 | 238.775 | 4.00 | 1.88300 | 40.8 | 64.12 | | | |
| 12 | 54.153 | 60.00 | | | 56.75 | | | |
| 13(aspheric surface) | 47.512 | 2.00 | 1.88300 | 40.8 | 43.07 | | | |
| 14 | 31.163 | 12.25 | 1.53172 | 48.8 | 40.69 | | | |
| 15 | −197.723 | 0.50 | | | 39.52 | | | |
| 16 | 78.592 | 3.00 | 1.75520 | 27.5 | 37.21 | | | |
| 17 | 27.934 | 2.49 | 1.67270 | 32.1 | 33.62 | | | |
| 18 | 37.380 | 4.35 | | | 33.23 | | | |
| 19 | 492.777 | 2.81 | 1.84666 | 23.8 | 33.06 | | | |
| 20 | −199.322 | 1.70 | 1.77250 | 49.6 | 32.78 | | | |
| 21 | 55.620 | 3.02 | | | 32.00 | | | |
| 22 | −10222.496 | 2.50 | 1.77250 | 49.6 | 32.12 | | | |
| 23 | 70.505 | 1.99 | | | 32.55 | | | |
| 24(aspheric surface) | 42.265 | 5.91 | 1.51742 | 52.4 | 35.05 | 0.55623 | −0.00042 | |
| 25 | 110.056 | 6.08 | | | 34.85 | | | |
| 26 | 57.336 | 12.00 | 1.65412 | 39.7 | 35.35 | 0.57403 | −0.00322 | |
| 27 | −23.153 | 2.50 | 1.88300 | 40.8 | 35.10 | 0.56694 | −0.00857 | |
| 28 | 188.890 | 13.83 | | | 36.30 | | | |
| 29 | 95.512 | 11.58 | 1.74077 | 27.8 | 42.05 | 0.60915 | 0.01264 | |
| 30 | −36.290 | 0.10 | 1.70877 | 21.6 | 42.09 | 0.81721 | 0.21074 | NLR |
| 31 | −46.420 | 2.50 | 1.88300 | 40.8 | 42.07 | 0.56694 | −0.00857 | |
| 32 | −252.061 | 7.72 | | | 42.63 | | | |
| 33 | ∞ | 2.00 | 1.51633 | 64.1 | 42.70 | | | |
| 34 | ∞ | | | | 42.71 | | | |

A value of $\Delta\theta gF$, as used herein, is defined as follows:

| $\Delta\theta gF = \theta gF - (-1.61783 \times 10^{-3} \times \nu d + 0.64146)$ | | |
|---|---|---|
| aspheric data | | |
| first surface | | |
| K = −2.94977e−001 | A4 = −3.03221e−008 | A6 = −4.24408e−012 |
| A8 = −5.18311e−016 | A10 = 1.82510e−020 | |
| third surface | | |
| K = 4.33371e−002 | A4 = −4.01087e−009 | A6 = 1.04905e−012 |
| A8 = 1.83181e−016 | A10 = 1.73973e−020 | A12 = 1.20418e−023 |
| fifth surface | | |
| K = −5.41580e−001 | A4 = −5.46427e−009 | A6 = 6.06667e−012 |
| A8 = 1.48079e−015 | A10 = −3.64330e−019 | A12 = 2.30482e−023 |
| thirteen surface | | |
| K = 8.95529e−002 | A4 = 1.69207e−007 | A6 = 2.37833e−010 |
| A8 = −3.68942e−013 | A10 = 7.47702e−016 | A12 = −3.83431e−019 |
| twenty fourth surface | | |
| K = 2.82995e+000 | A4 = −2.44534e−006 | A6 = −1.76512e−009 |
| A8 = −1.10606e−011 | A10 = 3.67099e−014 | A12 = −1.05591e−016 |
| seventh surface (diffractive surface) | | |
| C2 = −2.24790e−005 | C4 = −8.42035e−010 | C6 = 8.71868e−013 |
| C8 = −2.52614e−016 | | |

| various data | |
|---|---|
| zoom ratio | 1.00 |
| focal length | 585.02 |
| F-number | 4.12 |
| angle of view | 2.12 |
| image height | 21.64 |
| overall lens length | 330.00 |
| BF | 50.00 |
| incident pupil position | 159.38 |
| exit pupil position | −133.95 |
| front principal point position | −1116.13 |
| back principal point position | −535.02 |

| lens unit data | | | | |
|---|---|---|---|---|
| unit | starting surface | focal length | lens configuration length | front principal point position | back principal point position |
| L1 | 1 | 158.15 | 81.77 | 1.99 | −55.49 |
| L2 | 9 | 158.32 | 88.25 | 105.00 | 70.77 |
| L3 | 16 | −63.72 | 86.08 | −3.61 | −83.69 |
| L31 | 16 | −92.45 | 5.49 | 5.80 | 2.44 |
| L32 | 19 | −42.94 | 10.03 | 4.80 | −2.04 |
| L33 | 24 | 80.87 | 54.50 | 11.43 | −34.77 |
| G | 33 | ∞ | 2.00 | 0.66 | −0.66 |

| single lens data | | |
|---|---|---|
| lens | starting surface | focal length |
| 1 | 1 | 229.27 |
| 2 | 3 | 550.96 |
| 3 | 5 | −131.21 |
| 4 | 6 | 1950.13 |
| 5 | 7 | 136.42 |
| 6 | 10 | 289.50 |
| 7 | 11 | −80.13 |
| 8 | 13 | −108.80 |
| 9 | 14 | 51.59 |
| 10 | 16 | −58.89 |
| 11 | 17 | 148.57 |
| 12 | 19 | 167.93 |
| 13 | 20 | −56.13 |
| 14 | 22 | −90.63 |

| $\Delta\theta gF = \theta gF - (-1.61783 \times 10^{-3} \times \nu d + 0.64146)$ | | |
|---|---|---|
| 15 | 24 | 128.78 |
| 16 | 26 | 26.79 |
| 17 | 27 | −23.23 |
| 18 | 29 | 36.88 |
| 19 | 30 | −235.58 |
| 20 | 31 | −64.81 |
| G | 33 | 0.00 |

Table 1 illustrates an optical characteristic of a material of the optical element NFL made of the solid material in each embodiment. As illustrated in Table 1, the optical element NFL made of the solid material is solely made of a UV curing resin 1 in the numerical examples 1, 2, 7, and 8. The numerical example 5 utilizes N-polyvinyl carbazole only. Table 2 illustrates the optical characteristics of a UV curing resin 2 and $TiO_2$. The refractive index of the $TiO_2$ particles dispersed material is calculated using the above expression (A).

Each of the numerical examples 3, 4 and 6 uses $TiO_2$ dispersed in a synthetic resin. The numerical example 3 utilizes the UV curing resin 1 for the synthetic resin, and the volume rate of $TiO_2$ is 20%. The numerical examples 4 and 6 use the UV curing resin 2 for the synthetic resin, and their volume rates of $TiO_2$ are 20% and 3%, respectively. Table 3 illustrates a relationship between the above conditional expressions and various numerical values in each numerical example:

TABLE 1

| | Numerical Example | | | | |
|---|---|---|---|---|---|
| | 1, 2, 7, 8 UV Curing Resin 1 | 3 TiO₂ 20%-UV Curing Resin 1 | 4 TiO₂ 20%-UV Curing Resin 2 | 5 N-polyvinyl carbazole | 6 TiO₂ 3%-UV Curing Resin 2 |
| d-line Refractive Index | 1.63555 | 1.78927 | 1.70877 | 1.69591 | 1.55324 |
| g-line Refractive Index | 1.67532 | 1.85809 | 1.75988 | 1.75164 | 1.57249 |
| C-line Refractive Index | 1.62807 | 1.77777 | 1.70033 | 1.68528 | 1.54936 |
| F-line Refractive Index | 1.65604 | 1.82254 | 1.7331 | 1.72465 | 1.56326 |
| $\nu_d$ | 22.7 | 17.6 | 21.6 | 17.7 | 39.8 |
| $\theta_{gF}$ | 0.689 | 0.794 | 0.817 | 0.686 | 0.664 |
| $\Delta\theta_{gFNLF}$ | 0.0652 | 0.1507 | 0.1890 | 0.0424 | 0.0893 |
| $\Delta\theta_{gFNLR}$ | 0.0652 | 0.1507 | 0.1890 | 0.0424 | 0.0893 |
| $\Delta\theta_{gFL1i}$, $\Delta\theta_{gFL33j}$ | 0.0848 | 0.1811 | 0.2107 | 0.0727 | 0.0870 |

TABLE 2

| | UV Curing Resin 2 | TiO₂ |
|---|---|---|
| d-line Refractive Index | 1.52415 | 2.30377 |
| g-line Refractive Index | 1.53706 | 2.45676 |
| C-line Refractive Index | 1.52116 | 2.28032 |

TABLE 2-continued

|  | UV Curing Resin 2 | TiO$_2$ |
|---|---|---|
| F-line Refractive Index | 1.53133 | 2.37452 |
| $\nu_d$ | 51.6 | 13.8 |
| $\theta_{gF}$ | 0.563 | 0.873 |

TABLE 3

| | | Numerical Example | | | |
|---|---|---|---|---|---|
| | | 1 | 2 | 3 | 4 |
| Conditional Expression | (1) | 5.48 | 5.55 | 4.96 | 5.83 |
| | (2) | 69.10 | 139.55 | 682.54 | 356.10 |
| | (3) | 0.0652 | 0.0652 | 0.1507 | 0.1890 |
| | (4) | 0.161 | 0.128 | 0.116 | 0.409 |
| | (5) | 2.85 | 3.11 | 2.86 | 3.38 |
| | (6) | 1.53 | 1.55 | 1.63 | 1.66 |
| | (7) | 6.02 | 6.02 | 5.72 | 7.00 |
| | (8) | −9.19 | −20.76 | −8.48 | −11.17 |
| | (9) | 0.189 | 0.065 | 0.151 | 0.189 |
| | (10) | 1.29E−03 | 1.59E−03 | 1.51E−03 | 3.34E−03 |
| | (11) | −1.65E−02 | −1.75E−03 | −1.66E−02 | −2.81E−02 |

| | | Numerical Example | | | |
|---|---|---|---|---|---|
| | | 5 | 6 | 7 | 8 |
| Conditional Expression | (1) | 6.21 | 6.13 | 5.54 | 6.42 |
| | (2) | 112.93 | 120.12 | 96.89 | 126.74 |
| | (3) | 0.0424 | 0.0893 | 0.0652 | 0.0652 |
| | (4) | 0.483 | 0.263 | 0.200 | 0.126 |
| | (5) | 2.57 | 3.51 | 3.08 | 5.49 |
| | (6) | 1.70 | 1.84 | 1.57 | 1.84 |
| | (7) | 7.04 | 7.13 | 5.97 | 9.86 |
| | (8) | −6.57 | −10.35 | — | −15.31 |
| | (9) | 0.042 | 0.089 | — | 0.189 |
| | (10) | 3.40E−03 | 3.10E−03 | 9.13E−04 | 1.74E−03 |
| | (11) | −1.47E−02 | −1.87E−02 | −8.67E−04 | −1.16E−02 |

A description will now be given of an embodiment in which an optical system of the present invention is applied to an image pickup apparatus (camera system), with reference to FIG. 9. FIG. 9 is a schematic view of a principal part of a single-lens reflex camera.

In FIG. 9, reference numeral 10 denotes an image pickup lens having one of the image pickup optical systems 1 according to the first to eighth embodiments. The image pickup optical system 1 is held by a lens barrel 2 as a holding member. Reference numeral 20 denotes a camera body. The camera body includes a quick return mirror 3 configured to upwardly reflect a light flux from the image pickup lens 10, a focus plate 4 arranged at an imaging position of the image pickup lens 10, a pentagonal dach prism 5 configured to convert a reverse image formed on the focus plate 4 into an erect image, an eyepiece 6 used to observe the erect image, etc.

Reference numeral 7 denotes a photosensitive plane on which an image sensor (photosensitive conversion element) (imaging unit), such as a CCD sensor and a CMOS sensor, or a silver film is placed. In taking an image, the quick return mirror 3 retreats from the optical path and an image is formed on the photosensitive plane 7 by the image pickup lens 10. A lightweight and high optical performance image pickup apparatus is realized when one of the image pickup optical systems according to the first to eighth embodiments is applied to the image pickup apparatus, such as a photography camera, video camera, and a digital still camera, etc.

This embodiment is similarly applicable to a mirror-less camera that has no quick return mirror.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-016349, filed Jan. 30, 2012 which is hereby incorporated by reference herein in its entirety.

What is claimed is:

1. An image pickup optical system comprising, in order from an object side to an image side:
a first lens unit that does not move for focusing and has a positive optical power;
a second lens unit that moves during focusing;
an aperture diaphragm; and
a third lens unit that does not move for focusing,
wherein the image pickup optical system includes a diffractive optical element, and an optical element NLF made of a solid material on the object side of an intersection between a paraxial chief ray and an optical axis, and
wherein the following conditional expressions are satisfied where f is a focal length of an entire image pickup optical system in focusing upon an infinitely distant object, $f_1$ is a focal length of the first lens unit, Fno is an F-number of the entire image pickup optical system in focusing upon an infinitely distant object, $d_{1a}$ is a distance from a lens surface vertex of the first lens unit closest to an object to a lens surface vertex of the first lens unit closest to an image, $f_{DOE}$ is a focal length only by a diffraction component of the diffractive optical element, $f_{NLF}$ is a focal length of the optical element NLF, and $\Delta\theta g_{FNLF}$ is a partial dispersion ratio difference of a material of the optical element NLF:

$4.0 < f^2/(f_1 \times Fno \times d_{1a}) < 10.0;$ $20 < f_{DOE} \times f_{NLF}/f^2 < 1000;$ and $0.0272 < \Delta\theta g_{FNLF} < 0.3000.$ 2. The image pickup optical system according to claim 1, wherein the first lens unit includes, in order from the object side to the image side, a first positive lens element, a second positive lens element having a meniscus shape with a convex surface on the object side, and a cemented lens, the first positive lens element, the second positive lens element, and the cemented lens being separated from one another by air intervals.

3. The image pickup optical system according to claim 2, wherein the following conditional expression is satisfied where RM1 is a radius of curvature of a lens surface that is closest to the object of the second positive lens element, and RM2 is a radius of curvature of a lens surface that is closest to the image of the second positive lens element:

$0.01 < (RM2-RM1)/(RM1+RM2) < 0.70.$

4. The image pickup optical system according to claim 1, wherein the following conditional expression is satisfied where $f_{12}$ is a synthetic focal length of the first lens unit and the second lens unit in focusing upon the infinitely distant object, and L is a length on the optical axis from a lens surface vertex that is closest to the object in the entire image pickup optical system to an image plane:

$2.0 < f^2/(f_{12} \times L) < 10.0.$

5. The image pickup optical system according to claim 1, wherein the following conditional expression is satisfied where $\phi_{PSUM}$ is a sum of powers of positive lens elements included in the first lens unit, and $\phi_{NSUM}$ is a sum of powers of negative lens elements included in the first lens unit:

$$1.4<|\phi_{PSUM}/\phi_{NSUM}|<3.0.$$

6. The image pickup optical system according to claim 1, wherein the following conditional expression is satisfied where $d_{-sp}$ is a length on the optical axis from a lens surface vertex closest to the object to the aperture diaphragm, and L is a length on the optical axis from a lens surface vertex that is closest to the object in the entire image pickup optical system to an image plane:

$$4.0<f^2/(d_{-sp}\times L)<15.0.$$

7. The image pickup optical system according to claim 1, further comprising an optical element NLR made of a solid material arranged on the image side of the intersection between the paraxial chief ray and the optical axis,
wherein the following conditional expression is satisfied where $f_{NLR}$ is a focal length of the optical element NLR, and $\Delta\theta g_{FNLR}$ is a partial dispersion ratio difference of a material of the optical element NLR:

$$-50.0<f_{DOE}\times f_{NLR}/f^2<-2.0; \text{ and}$$

$$0.0272<\Delta\theta g_{FNLR}<0.3000.$$

8. The image pickup optical system according to claim 1, further comprising an optical element NLR made of a solid material arranged on the image side of the intersection between the paraxial chief ray and the optical axis,
wherein the third lens unit includes, in order from the object side to the image side, a first lens subunit, a second lens subunit, and a third lens subunit, the second lens subunit moving so as to have a direction having a component perpendicular to the optical axis and to move an imaging position in a direction perpendicular to the optical axis, and
wherein $\phi_{L1i}$ is a power of an i-th (i=1, 2 ... ) optical element counted in order from the object side to the image side in the first lens unit, $\Delta\theta g_{FL1i}$ is a partial dispersion ratio difference of a material of the i-th optical element, $\nu_{L1i}$ is an Abbe number of the material of the i-th optical element, $\phi_{L33j}$ is a power of a j-th (j=1, 2 ... ) optical element counted in order from the object side to the image side in the third lens subunit, $\Delta\theta g_{FL33j}$ is a partial dispersion ratio difference of a material of the j-th optical element, $\nu_{L33j}$ is an Abbe number of the material of the j-th optical element, $\phi$ is a power of the entire image pickup optical system, n is the number of lenses included in the first lens unit, and m is the number of lenses included in the third lens subunit:

$$5\times 10^{-4}<\sum_{i=1}^{n}\frac{\Delta\theta g_{FL1i}\times\varphi_{L1i}}{\nu_{L1i}\times\varphi}<5\times 10^{-3}$$

$$-5\times 10^{-2}<\sum_{j=1}^{m}\frac{\Delta\theta g_{FL33j}\times\varphi_{L33j}}{\nu_{L33j}\times\varphi}<-5\times 10^{-4}$$

9. An image pickup optical system comprising, in order from an object side to an image side:
a first lens unit that does not move for focusing and has a positive optical power;
an aperture diaphragm;
a second lens unit that does not move for focusing; and
a third lens unit that moves during focusing,
wherein the image pickup optical system includes a diffractive optical element, and an optical element NLF made of a solid material on the object side of an intersection between a paraxial chief ray and an optical axis, and
wherein the following conditional expressions are satisfied where f is a focal length of an entire image pickup optical system in focusing upon an infinitely distant object, $f_1$ is a focal length of the first lens unit, Fno is an F-number of the entire image pickup optical system in focusing upon an infinitely distant object, $d_{1a}$ is a distance from a lens surface vertex of the first lens unit closest to an object to a lens surface vertex of the first lens unit closest to an image, $f_{DOE}$ is a focal length only by a diffraction component of the diffractive optical element, $f_{NLF}$ is a focal length of the optical element NLF, and $\Delta\theta g_{FNLF}$ is a partial dispersion ratio difference of a material of the optical element NLF:

$$4.0<f^2/(f_1\times Fno\times d_{1a})<10.0;$$

$$20<f_{DOE}\times f_{NLF}/f^2<1000; \text{ and}$$

$$0.0272<\Delta\theta g_{FNLF}<0.3000.$$

10. The image pickup optical system according to claim 9, wherein the first lens unit includes, in order from the object side to the image side, a first positive lens element, a second positive lens element having a meniscus shape with a convex surface on the object side, and a cemented lens, the first positive lens element, the second positive lens element, and the cemented lens being separated from one another by air intervals.

11. The image pickup optical system according to claim 10, wherein the following conditional expression is satisfied where RM1 is a radius of curvature of a lens surface that is closest to the object of the second positive lens element, and RM2 is a radius of curvature of a lens surface that is closest to the image of the second positive lens element:

$$0.01<(RM2-RM1)/(RM1+RM2)<0.70.$$

12. The image pickup optical system according to claim 9, wherein the following conditional expression is satisfied where $f_{12}$ is a synthetic focal length of the first lens unit and the second lens unit in focusing upon the infinitely distant object, and L is a length on the optical axis from a lens surface vertex that is closest to the object in the entire image pickup optical system to an image plane:

$$2.0<f^2/(f_{12}\times L)<10.0.$$

13. The image pickup optical system according to claim 9, wherein the following conditional expression is satisfied where $\phi_{PSUM}$ is a sum of powers of positive lens elements included in the first lens unit, and $\phi_{NSUM}$ is a sum of powers of negative lens elements included in the first lens unit:

$$1.4<|\phi_{PSUM}/\phi_{NSUM}|<3.0.$$

14. The image pickup optical system according to claim 9, wherein the following conditional expression is satisfied where $d_{-sp}$ is a length on the optical axis from a lens surface vertex closest to the object to the aperture diaphragm, and L is a length on the optical axis from a lens surface vertex that is closest to the object in the entire image pickup optical system to an image plane:

$$4.0<f^2/(d_{-sp}\times L)<15.0.$$

15. The image pickup optical system according to claim 9, further comprising an optical element NLR made of a solid material arranged on the image side of the intersection between the paraxial chief ray and the optical axis,
   wherein the following conditional expression is satisfied where $f_{NLR}$ is a focal length of the optical element NLR, and $\Delta\theta g_{FNLR}$ is a partial dispersion ratio difference of a material of the optical element NLR:

$-50.0 < f_{DOE} \times f_{NLR}/f^2 < -2.0$; and $0.0272 < \Delta\theta g_{FNLR} < 0.3000$.

16. The image pickup optical system according to claim 9, further comprising an optical element NLR made of a solid material arranged on the image side of the intersection between the paraxial chief ray and the optical axis,
   wherein the third lens unit includes, in order from the object side to the image side, a first lens subunit, a second lens subunit, and a third lens subunit, the second lens subunit moving so as to have a direction having a component perpendicular to the optical axis and to move an imaging position in a direction perpendicular to the optical axis, and
   wherein $\phi_{L1i}$ is a power of an i-th (i=1, 2 . . . ) optical element counted in order from the object side to the image side in the first lens unit, $\Delta\theta g_{FL1i}$ is a partial dispersion ratio difference of a material of the i-th optical element, $\nu_{L1i}$ is an Abbe number of the material of the i-th optical element, $\phi_{L33j}$ is a power of a j-th (j=1, 2 . . . ) optical element counted in order from the object side to the image side in the third lens subunit, $\Delta\theta g_{FL33j}$ is a partial dispersion ratio difference of a material of the j-th optical element, $\nu_{L33j}$ is an Abbe number of the material of the j-th optical element, $\phi$ is a power of the entire image pickup optical system, n is the number of lenses included in the first lens unit, and m is the number of lenses included in the third lens subunit:

$$5 \times 10^{-4} < \sum_{i=1}^{n} \frac{\Delta\theta g_{FL1i} \times \varphi_{L1i}}{\nu_{L1i} \times \varphi} < 5 \times 10^{-3}$$

$$-5 \times 10^{-2} < \sum_{j=1}^{m} \frac{\Delta\theta g_{FL33j} \times \varphi_{L33j}}{\nu_{L33j} \times \varphi} < -5 \times 10^{-4}$$

17. A camera comprising:
   an image pickup optical system; and
   an image sensor configured to receive light of an image formed by the image pickup optical system,
   wherein the image pickup optical system includes, in order from an object side to an image side:
   a first lens unit that does not move for focusing and has a positive optical power;
   a second lens unit that moves during focusing;
   an aperture diaphragm; and
   a third lens unit that does not move for focusing,
   wherein the first lens unit includes a diffractive optical element, and an optical element NLF made of a solid material on the object side of an intersection between a paraxial chief ray and an optical axis, and
   wherein the following conditional expressions are satisfied where f is a focal length of an entire image pickup optical system, $f_1$ is a focal length of the first lens unit, Fno is an F-number of the entire image pickup optical system in focusing upon an infinitely distant object, $d_{1a}$ is a distance from a lens surface vertex of the first lens unit closest to an object to a lens surface vertex of the first lens unit closest to an image, $f_{DOE}$ is a focal length only by a diffraction component of the diffractive optical element, $f_{NLF}$ is a focal length of the optical element NLF, and $\Delta\theta g_{FNLF}$ is a partial dispersion ratio difference of a material of the optical element NLF:

$4.0 < f^2/(f_1 \times Fno \times d_{1a}) < 10.0$;

$20 < f_{DOE} \times f_{NLF}/f^2 < 1000$; and $0.0272 < \Delta\theta g_{FNLF} < 0.3000$.

18. A camera comprising:
   an image pickup optical system; and
   an image sensor configured to receive light of an image formed by the image pickup optical system,
   wherein an image pickup optical system includes, in order from an object side to an image side:
   a first lens unit that does not move for focusing and has a positive optical power;
   an aperture diaphragm;
   a second lens unit that does not move for focusing; and
   a third lens unit that moves during focusing,
   wherein the first lens unit includes a diffractive optical element, and an optical element NLF made of a solid material on the object side of an intersection between a paraxial chief ray and an optical axis, and
   wherein the following conditional expressions are satisfied where f is a focal length of an entire image pickup optical system, $f_1$ is a focal length of the first lens unit, Fno is an F-number of the entire image pickup optical system in focusing upon an infinitely distant object, $d_{1a}$ is a distance from a lens surface vertex of the first lens unit closest to an object to a lens surface vertex of the first lens unit closest to an image, $f_{DOE}$ is a focal length only by a diffraction component of the diffractive optical element, $f_{NLF}$ is a focal length of the optical element NLF, and $\theta\Delta g_{FNLF}$ is a partial dispersion ratio difference of a material of the optical element NLF:

$4.0 < f^2/(f_1 \times Fno \times d_{1a}) < 10.0$;

$20 < f_{DOE} \times f_{NLF}/f^2 < 1000$; and $0.0272 < \Delta\theta g_{NLF} < 0.3000$.

\* \* \* \* \*